United States Patent
Willis et al.

(10) Patent No.: US 8,977,981 B2
(45) Date of Patent: Mar. 10, 2015

(54) SYSTEM AND METHOD FOR DEMARCATING A LOCATION ON A DISPLAY SCREEN DURING A SCROLLING OR TOUCH/FLICKING CONTENT MOVING OPERATION

(75) Inventors: Keith L. Willis, Rochester, NY (US); Christopher F. Patterson, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 79 days.

(21) Appl. No.: 13/408,565

(22) Filed: Feb. 29, 2012

(65) Prior Publication Data
US 2013/0227467 A1    Aug. 29, 2013

(51) Int. Cl.
*G06F 3/0485* (2013.01)
*G06F 3/0488* (2013.01)

(52) U.S. Cl.
CPC .......... *G06F 3/0485* (2013.01); *G06F 3/04855* (2013.01); *G06F 3/04883* (2013.01)
USPC .............................. 715/786; 715/784; 715/863

(58) Field of Classification Search
CPC . G06F 3/04855; G06F 3/0485; G06F 3/0483; G06F 3/03547; G06F 3/0482; G06F 3/04883
USPC ......... 715/784, 786, 833, 863, 974, 787, 973, 715/830
See application file for complete search history.

(56) References Cited

U.S. PATENT DOCUMENTS

| 7,103,851 | B1 * | 9/2006 | Jaeger ........................... 715/786 |
| 8,520,030 | B2 * | 8/2013 | Barrett .......................... 345/688 |
| 2005/0114791 | A1 * | 5/2005 | Bollenbacher et al. ........ 715/787 |
| 2006/0119898 | A1 * | 6/2006 | Cui ............................ 358/3.28 |
| 2009/0019389 | A1 * | 1/2009 | Aust ............................ 715/786 |
| 2009/0033684 | A1 * | 2/2009 | Barrett .......................... 345/684 |
| 2009/0092317 | A1 * | 4/2009 | Nagarajan et al. ............ 382/173 |
| 2012/0030625 | A1 * | 2/2012 | Miyazaki ..................... 715/830 |
| 2013/0104074 | A1 * | 4/2013 | Takahashi ..................... 715/784 |

* cited by examiner

*Primary Examiner* — Amy Ng
*Assistant Examiner* — Sang H Kim
(74) *Attorney, Agent, or Firm* — Michael J. Nickerson; Basch & Nickerson LLP

(57) ABSTRACT

A display unit enables content to be displayed in a human readable form. The display unit displays a portion of the content to be displayed wherein some of the content to be displayed is non-viewable on the display unit. The display unit, in response to a user-originating directional content moving action, determines a location within the portion of the content being displayed the determined location corresponding to a directional characteristic of the user-originating directional content moving action. The display unit causes a visual indicia to be displayed at the determined location within the portion of the content being displayed, the visual indicia providing a user orientation marker for the portion of the content being displayed. The display unit causes the visual indicia to visually move in a direction corresponding to the directional movement of the content.

14 Claims, 23 Drawing Sheets

How many generations of students, faculty, and staff had those trees witnessed pass under their boughs, she wondered? In that instant she realized how fleeting individual concerns of modern life are considered against the backdrop of history.

The air was redolent with the intermingled fragrances of damp earth and conifers, and as Carolina passed the botanical garden, she drank deeply the smells of spicy musk-scented climbing roses. In the aromatherapy workshop, Brianna had mentioned that the rose was the queen of the flower kingdom, and jasmine, the king She stepped under the old-fashioned, electrified lantern that, like a spotlight on a stage, illuminated the stairs to the College Theater. The theater's front doors stood wide open to let in the fresh air during the rehearsal.

*FIG. 21* fleeting individual concerns of modern life are considered against the backdrop of history.

The air was redolent with the intermingled fragrances of damp earth and conifers, and as Carolina passed the botanical garden, she drank deeply the smells of spicy musk-scented climbing roses. In the aromatherapy workshop, Brianna had mentioned that the rose was the queen of the flower kingdom, and jasmine, the king She stepped under the old-fashioned, electrified lantern that, like a spotlight on a stage, illuminated the stairs to the College Theater. The theater's front doors stood wide open to let in the fresh air during the rehearsal.

*FIG. 22*

Carolina strolled to campus, sniffing
appreciatively at the sweet fragrance
wafting from the mock orange bushes that
lined the walkway.

Somehow springtime had slipped into
early summer without her noticing.
Although it was not yet dark, a big full
moon had already risen, brightening the
Sistine blue sky in the East with its white
light.

To the west, the sky over the mountains
had turned a deep valentine rose with the
setting sun.

She made her way along sidewalk almost
empty of students at this late hour. Only
the sound of her footsteps and the
mysterious stirrings of nature in the
shrubbery kept her company.

Suddenly a crow cawed. She glanced
toward the canopy of great, old oaks that
spread a green mantle above her.

How many generations of students,
faculty, and staff had those trees
witnessed pass under their boughs, she
wondered? In that instant she realized how
fleeting individual concerns of modern life
are considered against the backdrop of
history.

The air was redolent with the intermingled
fragrances of damp earth and conifers,
and as Carolina passed the botanical
garden, she drank deeply the smells of
spicy musk-scented climbing roses. In the
aromatherapy workshop, Brianna had
mentioned that the rose was the queen of
the flower kingdom, and jasmine, the king She stepped under the old-fashioned,
electrified lantern that, like a spotlight on a
stage, illuminated the stairs to the College
Theater. The theater's front doors stood
wide open to let in the fresh air during the
rehearsal.

FIG. 23

SYSTEM AND METHOD FOR DEMARCATING A LOCATION ON A DISPLAY SCREEN DURING A SCROLLING OR TOUCH/FLICKING CONTENT MOVING OPERATION

BACKGROUND

Conventionally, to accommodate frames of content (text files, images, etc.) that exceed the horizontal/vertical boundaries of a display unit, a user would move or scroll the content through a display window, using a graphical user interface provided for on the display.

This scrolling of the content provides the user with an continuous view of the moving content in a contiguous manner as the user manipulates the graphical user interface; essentially moving the content upward or downward. In this manner, the viewable portion of the content is continuously changing as new portions of the content become viewable.

An example of a conventional scrolling content moving operation is illustrated in FIGS. 1-3. As illustrated in FIG. 1, a display device 10 includes a display area 20. The display device 10 may be a touchscreen display (the user interfaces directly with the displayed content by touching the display area 20) or a traditional display device, such as a LCD panel, plasma panel, cathode ray tube, etc. (the user interfaces indirectly with the displayed content through a visual pointing device 70, which is displayed in the display area 20—the visual pointing device 70 may be controlled by a mouse or other conventional user input device).

The display area 20 may display content 60 in a window 30 created by an application or other software, as illustrated in FIG. 1. The window 30 may also include navigational graphical user interfaces or icons to enable a user to navigate the displayed content 60.

As shown in FIG. 1, the navigational graphical user interfaces or icons may include a scroll up activatable area 42, a scroll down activatable area 48, a vertical jump activatable area 44, a vertical navigation bar 46, a scroll left activatable area 52, a scroll right activatable area 58, a horizontal jump activatable area 56, a horizontal navigation bar 54, As illustrated in FIG. 2, the content 60 to be displayed may not always fit within the window 30. As shown in FIG. 2, the content 60 includes a portion (black text) that is viewable within the window 30, and a portion (greyed text) that is not viewable within the window 30.

To view the non-viewable portion, conventionally, as illustrated in FIG. 3, the user would activate the scroll down activatable area 48 causing the previously viewable paragraph starting with "Carolina" to move upward in a continuous fashion as long as the scroll down activatable area 48 is active (activated by the user). Eventually, the previously viewable paragraph starting with "Carolina" (grayed text) is not viewable within the window 30, and the previously non-viewable paragraph starting with "The air" (black text) becomes viewable in the window 30.

As illustrated in FIGS. 1-3, scrolling is generally an operation wherein data (content) contained within the window 30 is moved with respect to its apparent position within the borders of the window 30.

For example, if the window 30 is sized such that only half the content can be viewable, through the use of scrolling controls, the other portions of the content can be progressively brought into view. In other words, the content of the viewable area can be controlled by the operator in both the vertical, and potentially the horizontal directions, within the window 30. However, the scrolling process does not necessarily emulate the mechanics of actually reading a hard copy of the content.

In a conventional hard copy format, the reader subconsciously synchronizes the movement of the eyes to read down the page at a specific line frequency, absent break points and unintentional interruption and perturbations that can be disruptive to the period of the line reading frequency. The act of turning a page of a hard copy document is an anticipated event, whereby the reader proactively prepares to go to the very top of the next page once the last line has been read, thereby always retaining their place in the document.

On the other hand, scrolling, as compared to actually reading a hard copy document presents issues with respect to the reader maintaining a sense of location within the document. More specifically, as the reader scrolls the content, due to the lack of physical breakpoints (such as an end of page) or other visual clues, the reader has to re-orientate themselves after each scrolling operation to the new viewable content in the window.

For example, using conventional scrolling, a user reads or views the displayed portion of the content, as viewed within the window from top to bottom, and then, after reading or viewing the last bit of content displayed in the window on the screen, the user invokes a software command, with either a keystroke or a pointing device, that causes the content being currently displayed to move in a vertical or horizontal direction so that new content becomes viewable in the window.

However, since the conventional scrolling operation does not provide any visual clues as to location within the content, the reader needs to reposition their view position within the window. This is because the newly displayed content essentially enters the window from a particular direction and is stitched to the previously viewed content in an endeavor to provide a sense of continuity in the content. This has been conventionally realized by the user reading or viewing previously read or viewed content to provide the reader with a point of reference and consistency; however, the consistent need to re-read or review previously read or viewed content can be frustrating to the reader and slow the actual reading process.

In other words, the user has to search for their previous viewing position according to the last bit of content read or viewed, each time a scrolling function is executed, thereby exasperating the user and creating an unproductive situation as the conventional scrolling operation can directly interfere with one's natural reading or viewing rhythm.

In addition, when using a conventional touch/flicking content moving system or device, the display screen does not necessarily provide visual activatable areas to initiate content movement, as illustrated in FIG. 14.

In these conventional touch/flicking content moving systems or devices, the direction, amount, and/or speed of content being moved is based upon a sensed direction of an object (typically a user's finger) moving over the touch display 30 and/or a sensed inertia and/or a sensed speed or acceleration of the object moving over the touch display 30, as illustrated in FIG. 15.

More specifically, as illustrated in FIG. 15, the conventional touch/flicking content moving system or device sensed an upward direction of the object being moving (or flicked) over the touch display 30. The sensed inertia and/or a sensed speed or acceleration of the object being moving (or flicked) over the touch display 30 caused the content to move a full paragraph.

In these conventional systems, the sensed inertia and/or a sensed speed or acceleration of the object being moving (or flicked) over the touch display 30 can cause the user to lose track of the last bit of content read or viewed.

Thus, it is desirable to provide a scrolling and/or touch/flicking content moving system or method which provides the visual clues of the traditional hard copy document so as to substantially reduce the exasperation realized by the reader and to provide a productive environment when viewing content using a scrolling and/or touch/flicking content moving function.

BRIEF DESCRIPTION OF THE DRAWING

The drawings are only for purposes of illustrating various embodiments and are not to be construed as limiting, wherein:

FIGS. 16-23 illustrate an example of demarcated touch/flicking content moving operation.

DETAILED DESCRIPTION

Figure 1:
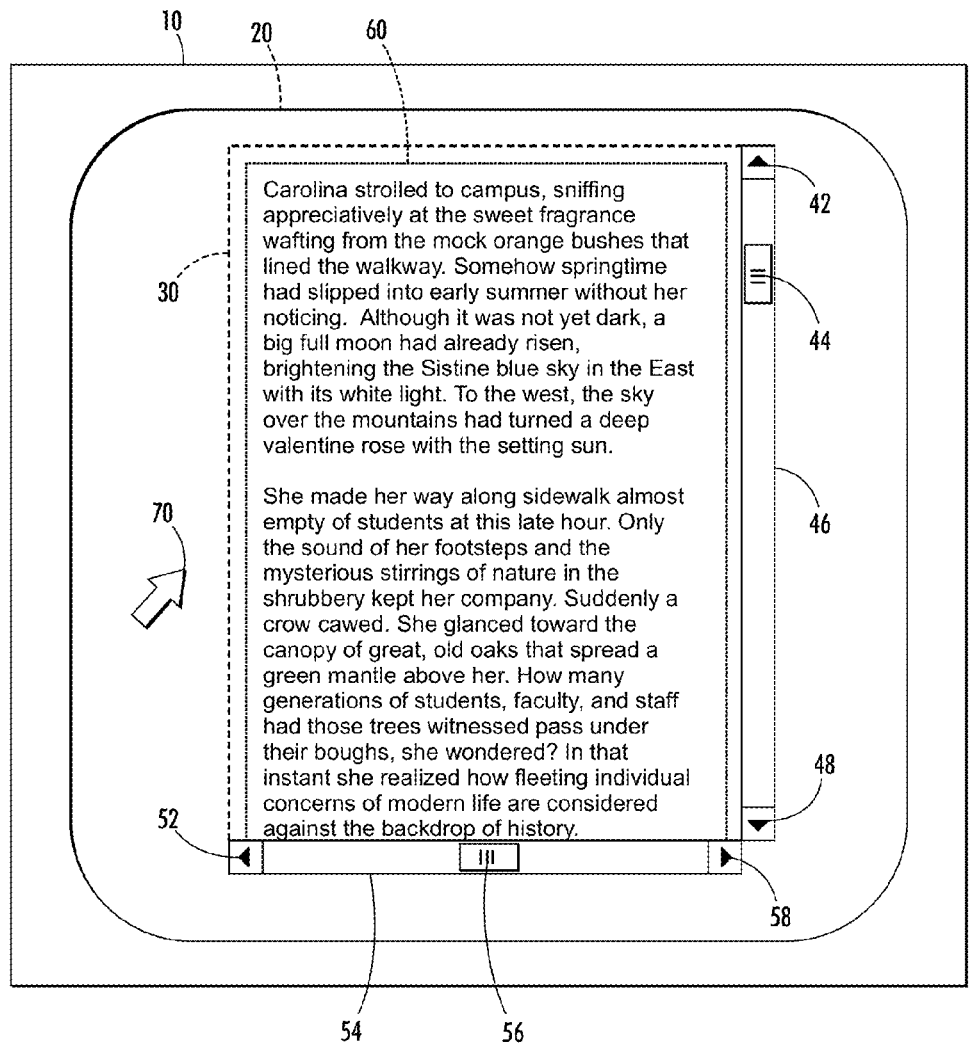
FIGS. 1-3 illustrate an example of a conventional scrolling content moving operation.
Figure 2:
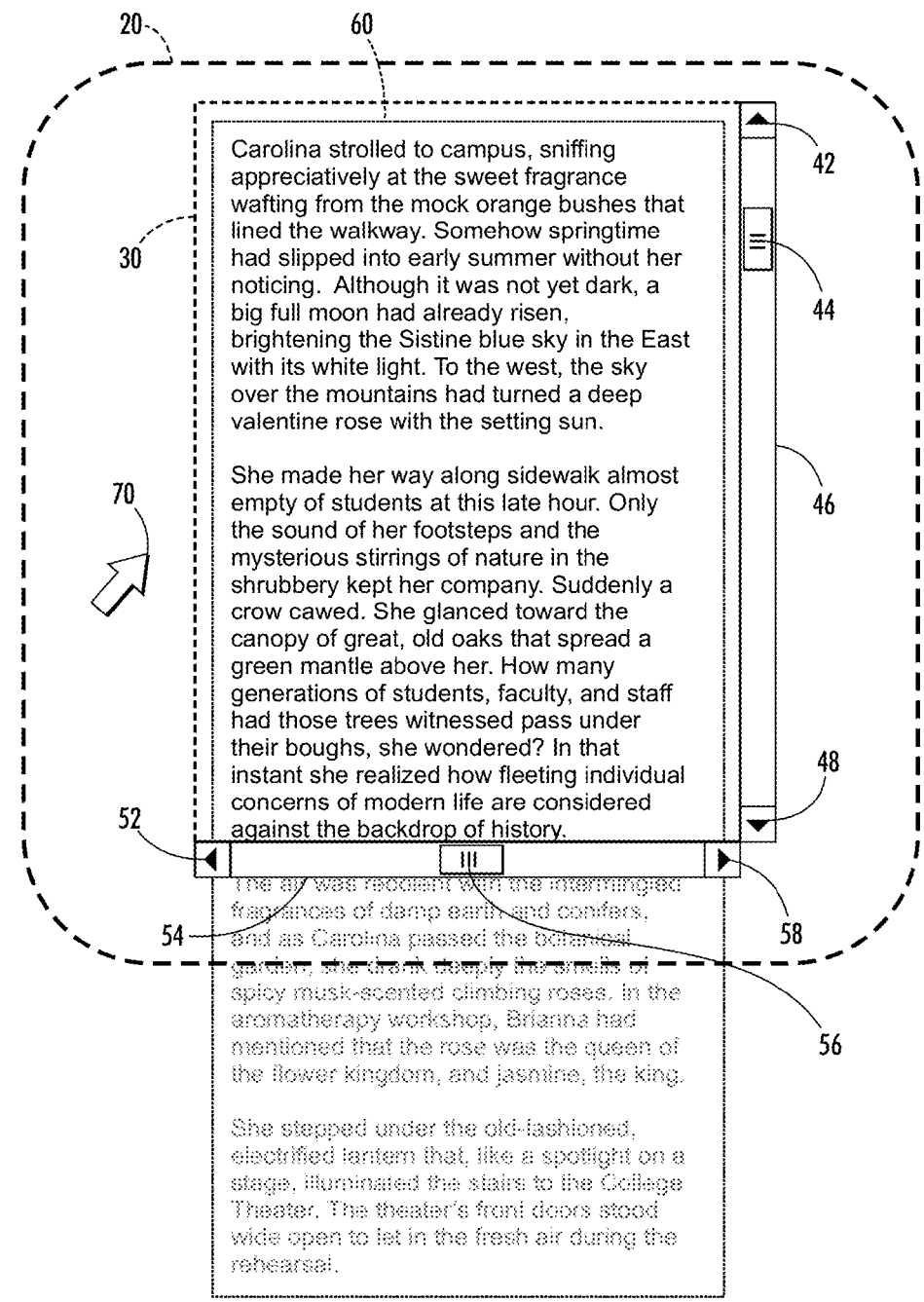
Figure 3:
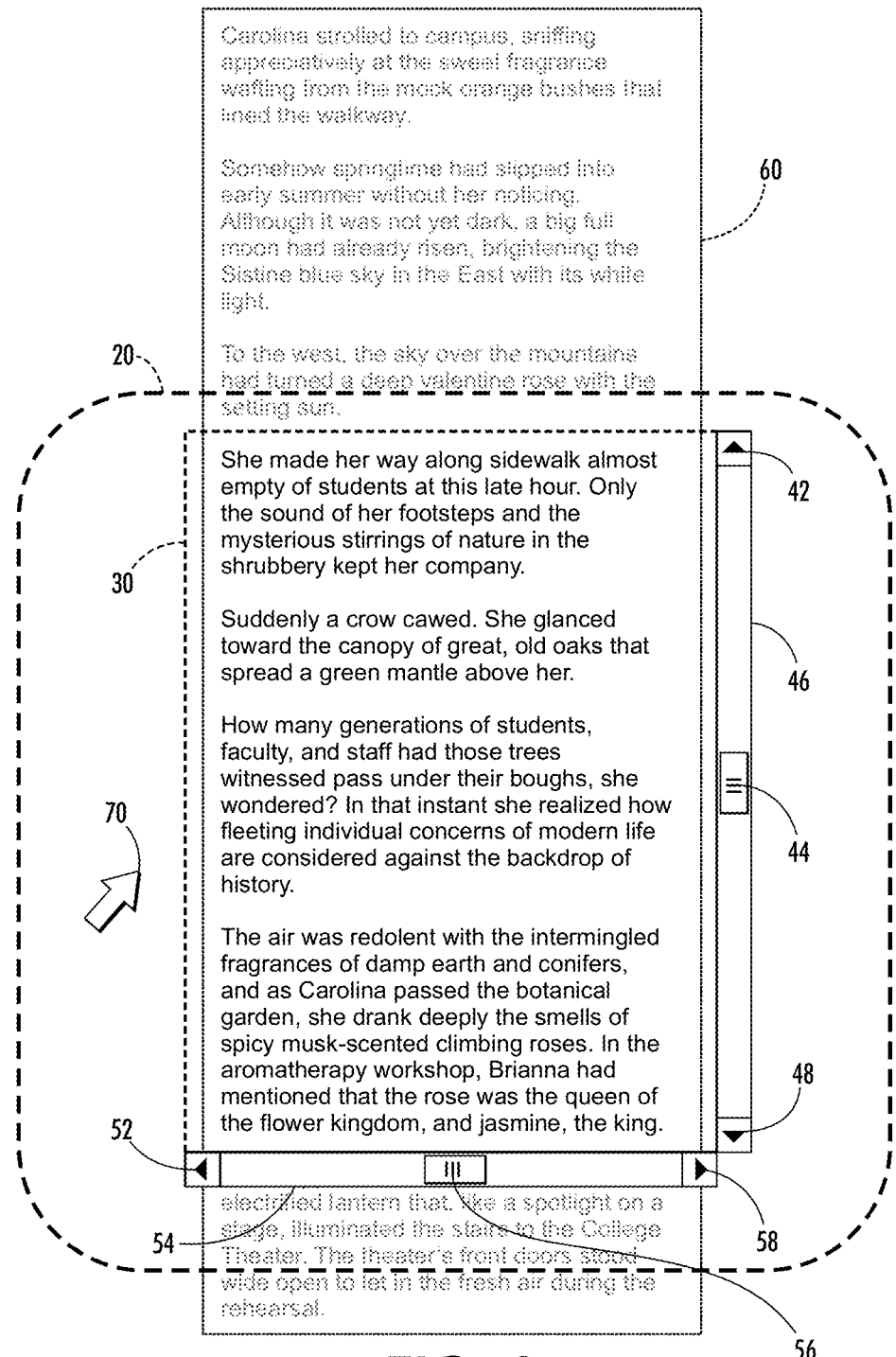

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

As discussed above, it is desirable to provide a process that provides real-time visual feedback to the user while scrolling to navigate through displayed content.

As noted above, scrolling of the content provides the user with an continuous view of the moving content in a contiguous manner as the user manipulates a graphical user interface to essentially move the content upward or downward (or left or right) so that the viewable portion of the content is continuously changing as new portions of the content become viewable.

To realize such a process, a transient visual tool or marker may be provided for direct visual guidance to the user relative the newly revealed portion of the scrolled content that is continually being exposed to view (becoming viewable) during the scrolling operation. An example of a scrolling process that provides a transient visual tool or marker is illustrated in FIGS. 4-9.

Figure 4:
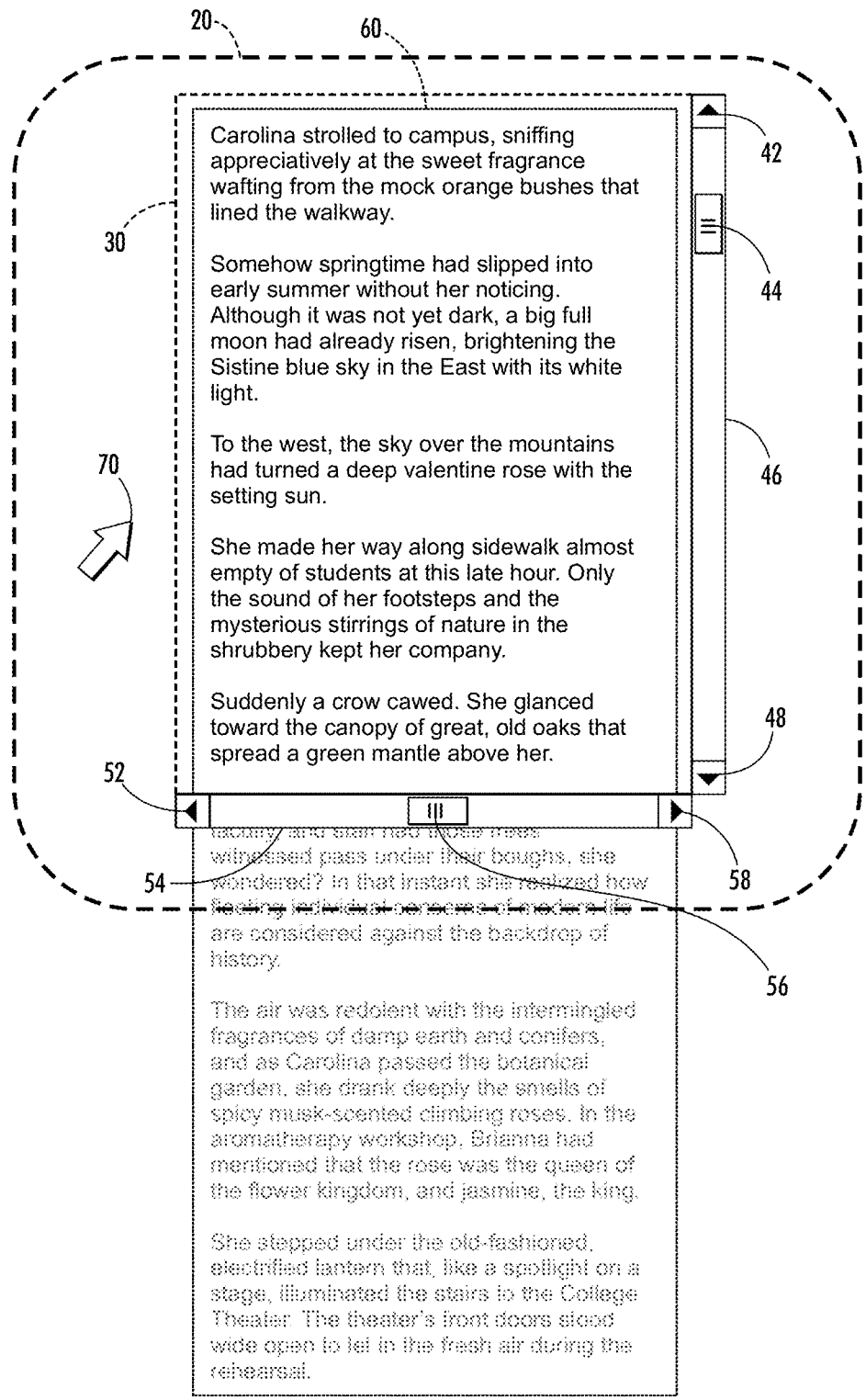
FIGS. 4-10 illustrate an example of demarcated scrolling content moving operation.

As illustrated in FIG. 4, a display area 20 is provided to display content. The display area 20 may be part of a display device (not shown), wherein the display device may be a touchscreen display (the user interfaces directly with the displayed content by touching the display area 20) or a traditional display device, such as a LCD panel, plasma panel, cathode ray tube, etc. (the user interfaces indirectly with the displayed content through a visual pointing device 70, which is displayed in the display area 20—the visual pointing device 70 may be controlled by a mouse or other conventional user input device).

The display area 20 may display content 60 in a window 30 created by an application or other software, as illustrated in FIG. 4. The window 30 may also include navigational graphical user interfaces or icons to enable a user to navigate the displayed content 60.

As shown in FIG. 4, the navigational graphical user interfaces or icons may include a scroll up activatable area 42, a scroll down activatable area 48, a vertical jump activatable area 44, a vertical navigation bar 46, a scroll left activatable area 52, a scroll right activatable area 58, a horizontal jump activatable area 56, a horizontal navigation bar 54, As illustrated in FIG. 4, the content 60 to be displayed may not always fit within the window 30. As shown in FIG. 4, the content 60 includes a portion (black text) that is viewable within the window 30, and a portion (greyed text) that is not viewable within the window 30.

Figure 5:
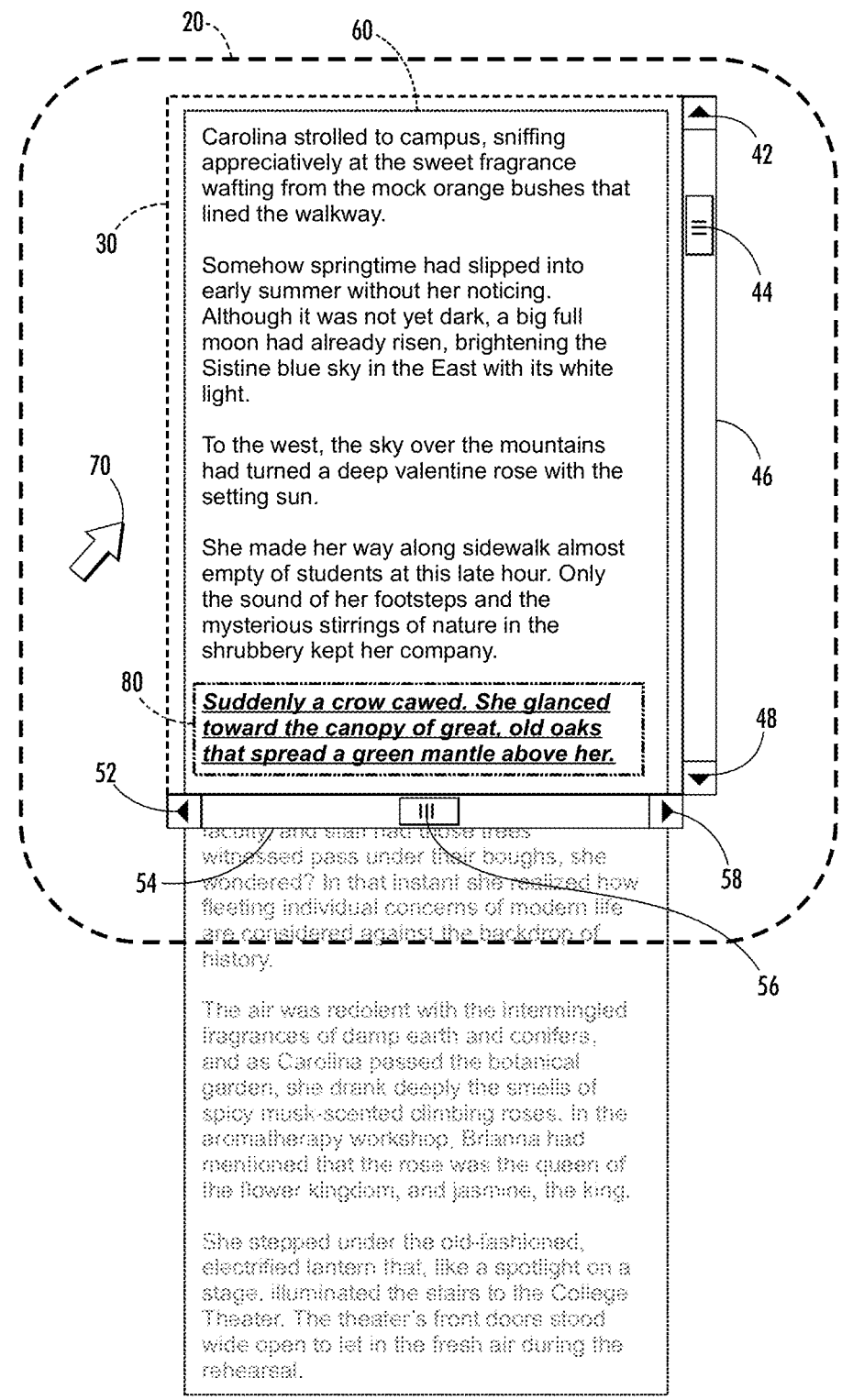

To view the non-viewable portion, conventionally, as illustrated in FIG. 5, the user would activate the scroll down activatable area 48 causing the previously viewable paragraph starting with "Carolina" to move upward in a continuous fashion as long as the scroll down activatable area 48 is active (activated by the user). Eventually, the previously viewable paragraph starting with "Carolina" (grayed text) is not viewable within the window 30, and the previously non-viewable paragraph starting with "How many" (black text) becomes viewable in the window 30.

To provide a visual tool or marker (indicia) so that the user can readily identify the end (with respect to the direction of scrolling) of the previously displayed content, the display unit demarcates a portion of the displayed content.

As illustrated in FIG. 5, the demarcated content 80 has been boldfaced, italicized, and underlined to provide the visual tool or marker (indicia). It is noted that the demarcated content 80 could also have been highlighted or enclosed with a box or other type of marker or visual tool.

Figure 12:
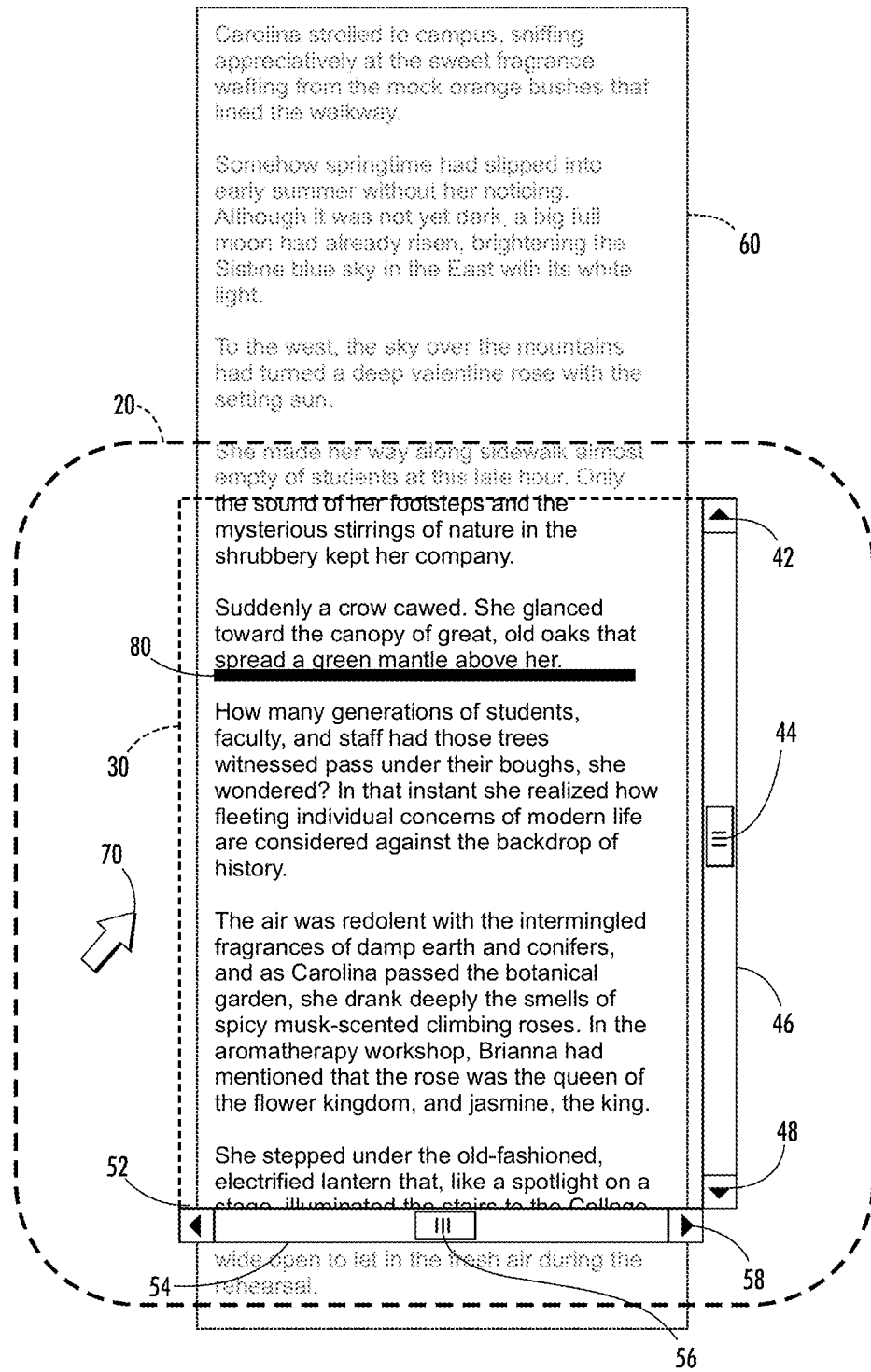
FIGS. 12 and 13 illustrate example of different visual indicia or markers.

FIG. 12 illustrates the use of a line as a marker or visual tool to demarcate the content.

Figure 13:
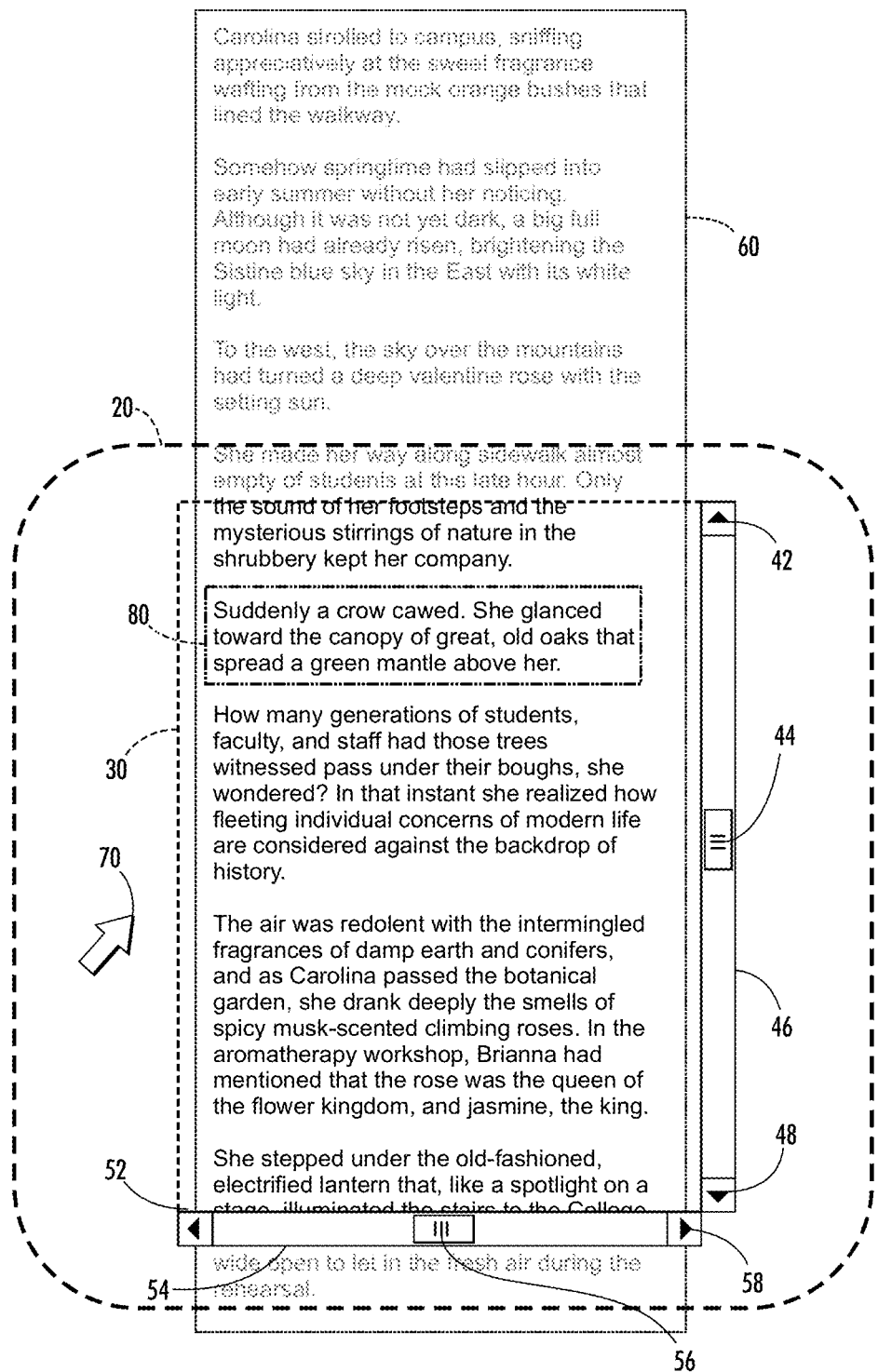
Figure 14:
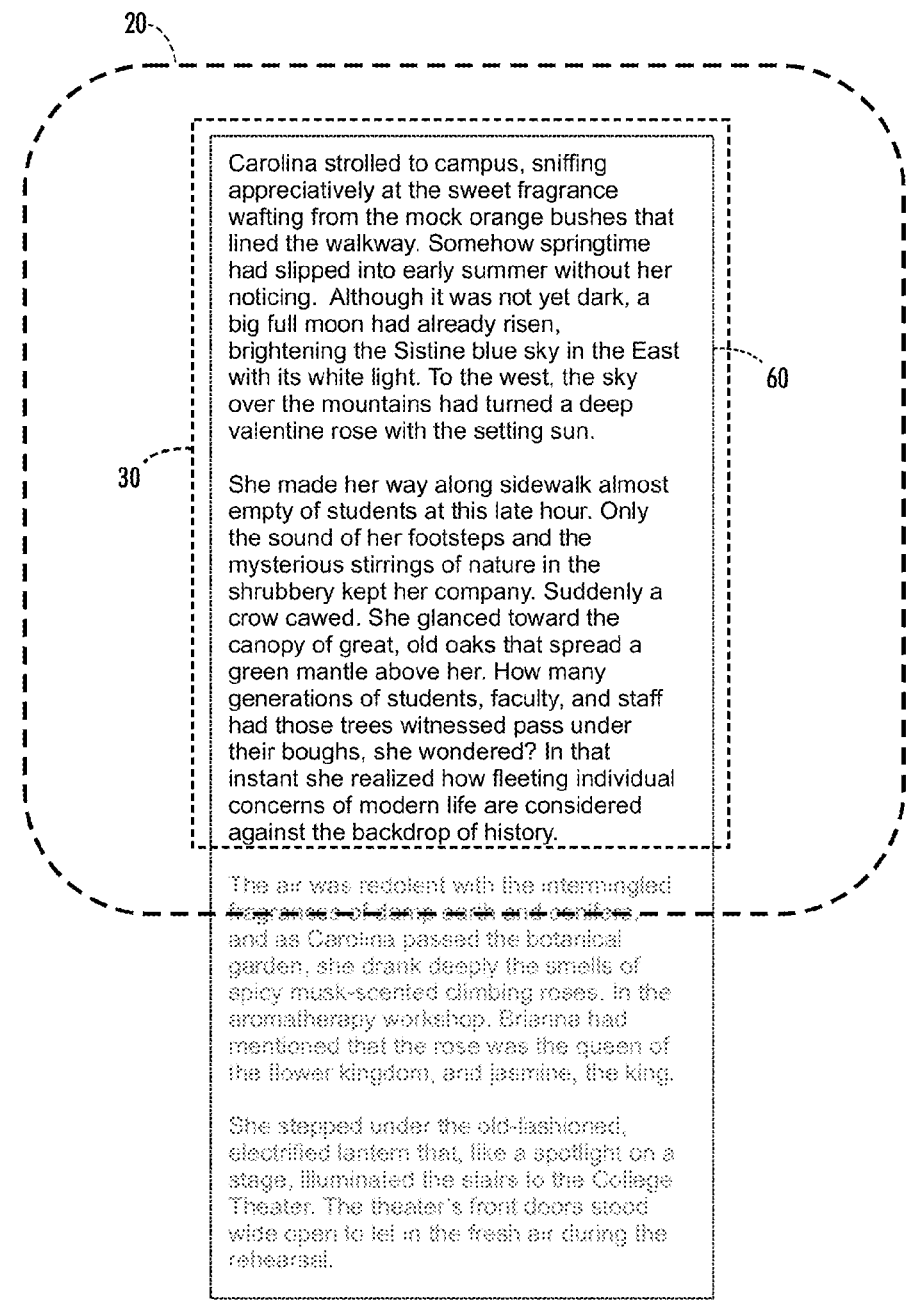
FIGS. 14 and 15 illustrate an example of a conventional touch/flicking content moving operation.
Figure 15:
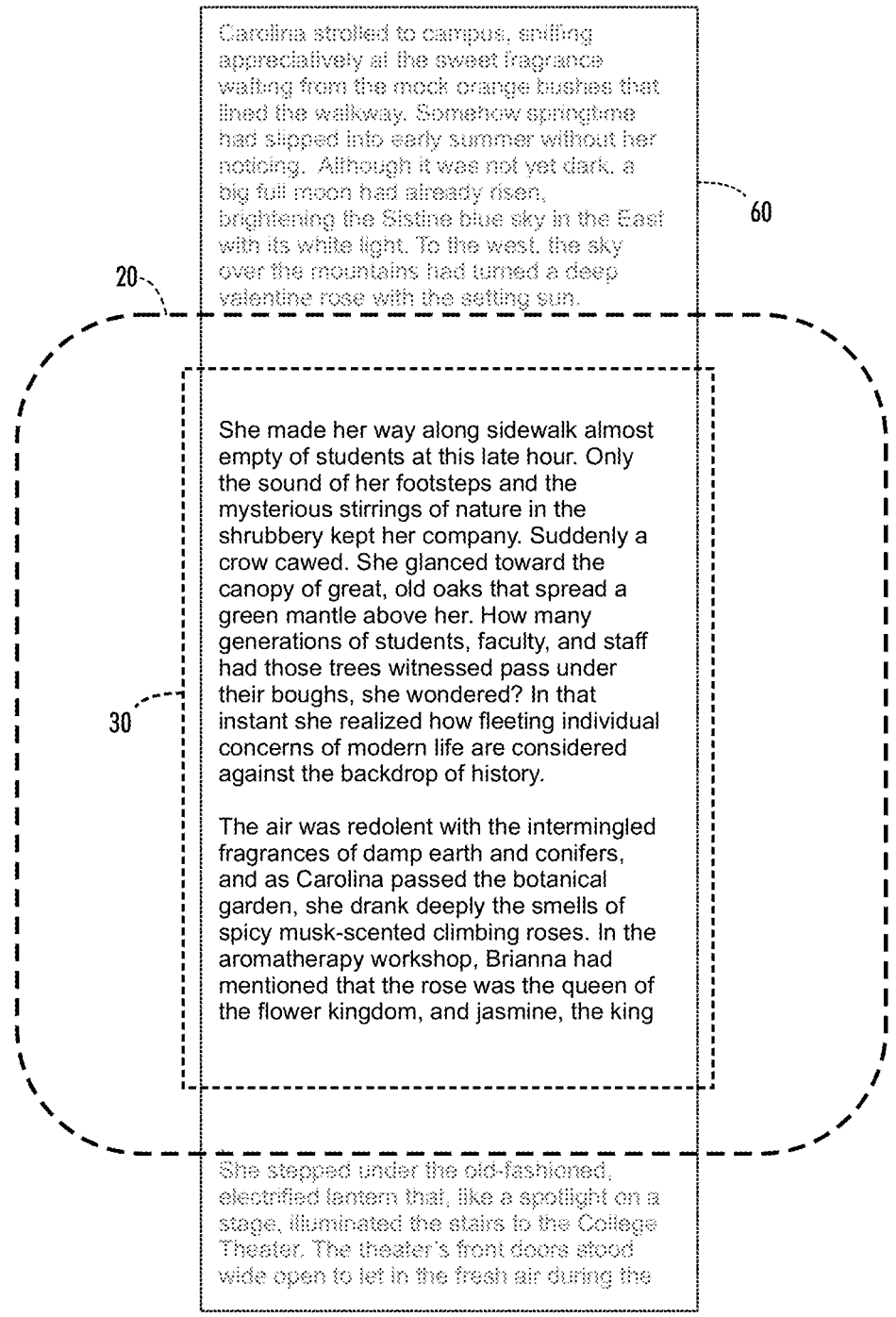

FIG. 13 illustrates the use of graying or changing the transparency property of the text as a marker or visual tool to demarcate the content.

The scrolling content moving operation determines, based upon the direction of scrolling selected by the user, the content to be demarcated as the visual tool or marker (indicia).

For example, if the scrolling direction selected by the user is downward (the viewing window is moved downward relative to the content although the content appears to move upward), the scrolling content moving operation would select the content located at the bottom of the display area 20, as illustrated in FIG. 5, to be demarcated as the visual tool or marker (indicia).

Figure 6:
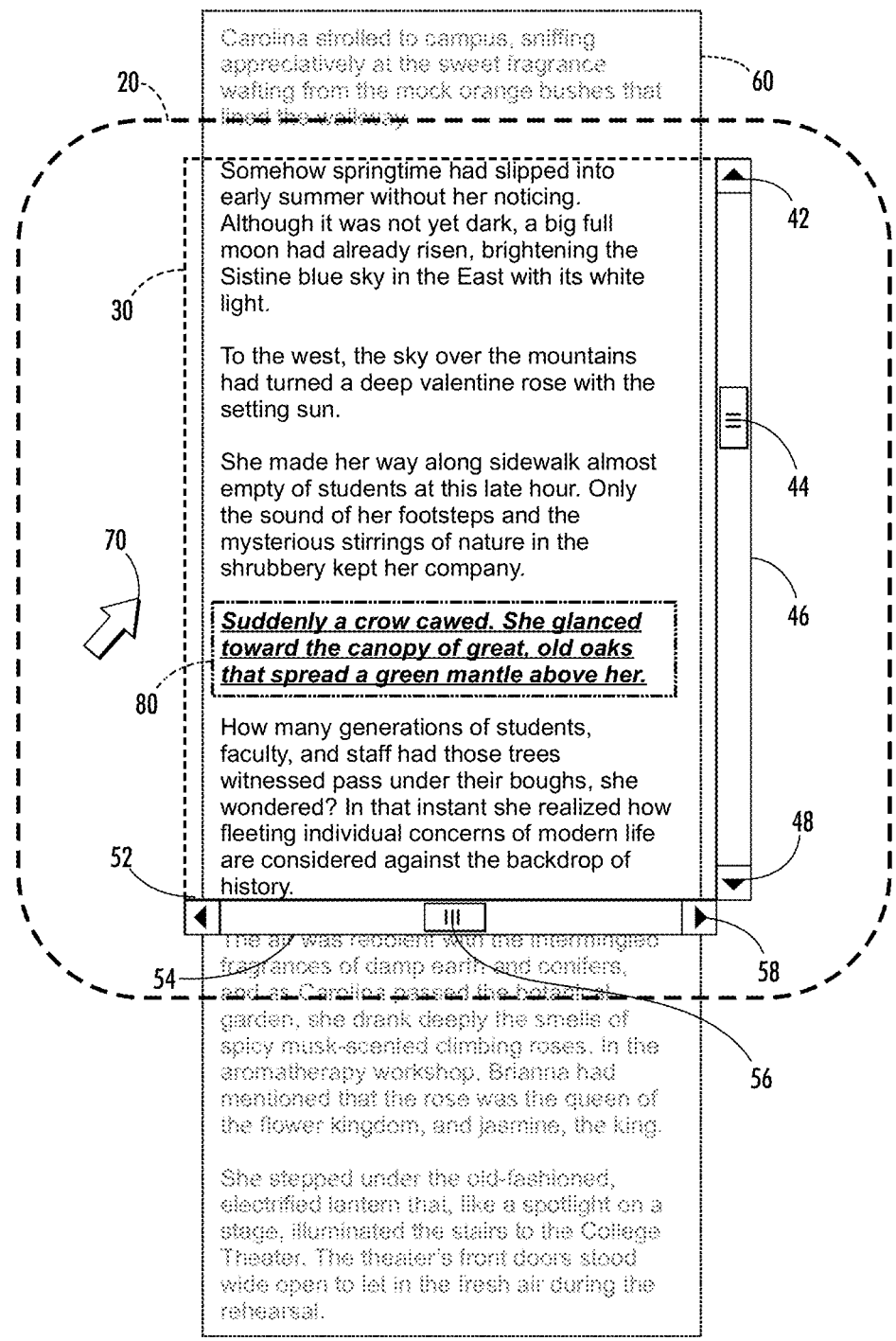

On the other hand, if the scrolling direction selected by the user is upward (the viewing window is moved upward relative to the content although the content appears to move downward), the scrolling content moving operation would select the content located at the top of the display area 20, as illustrated in FIG. 6, to be demarcated as the visual tool or marker (indicia).

The scrolling content moving operation continues to cause the viewing window to move downward (the content appearing to move upward), the demarcated content 80 remains the same, but its relative location in the display area 20 moves in accordance with the direction of the scrolling operation.

Figure 7:
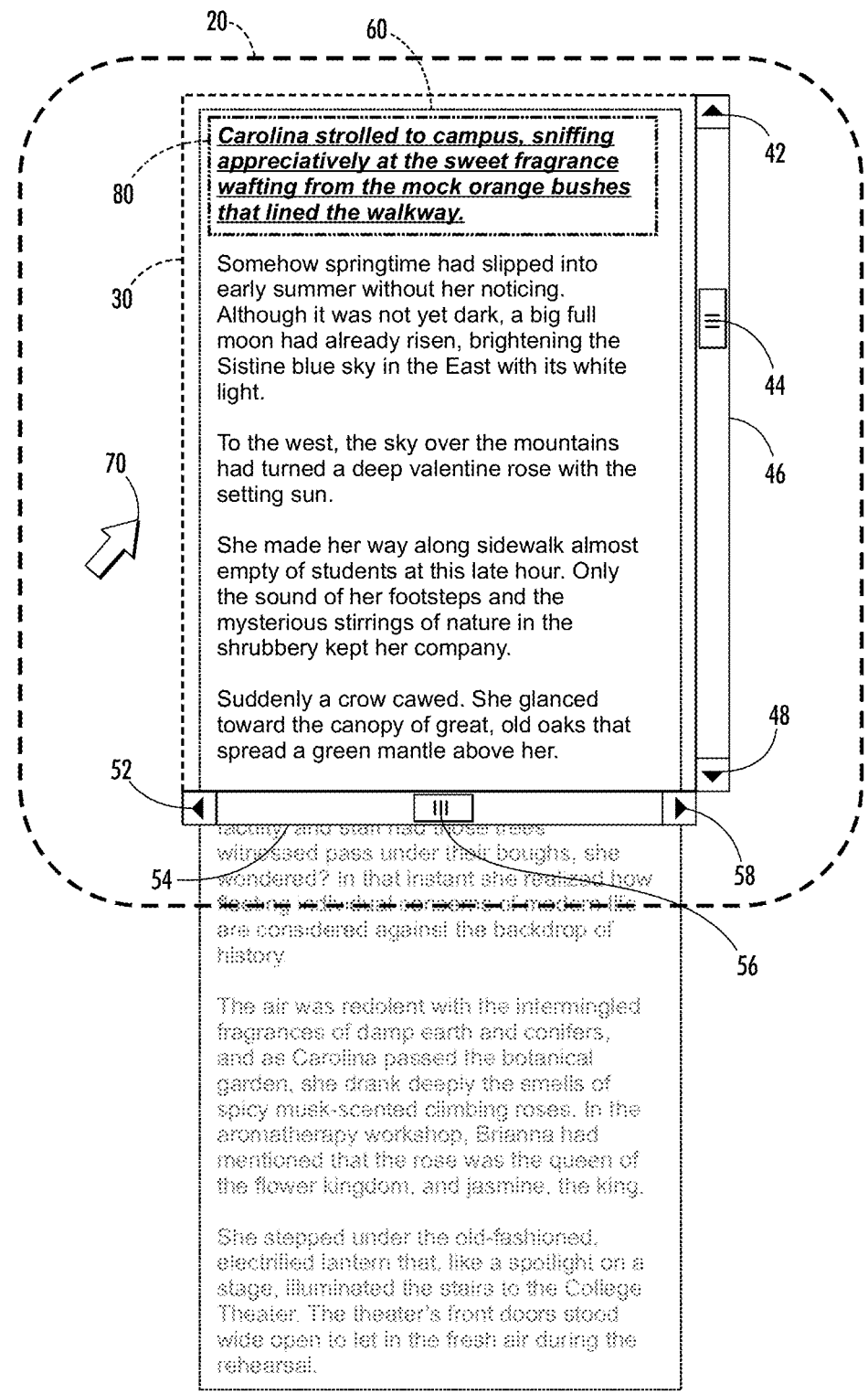
Figure 8:
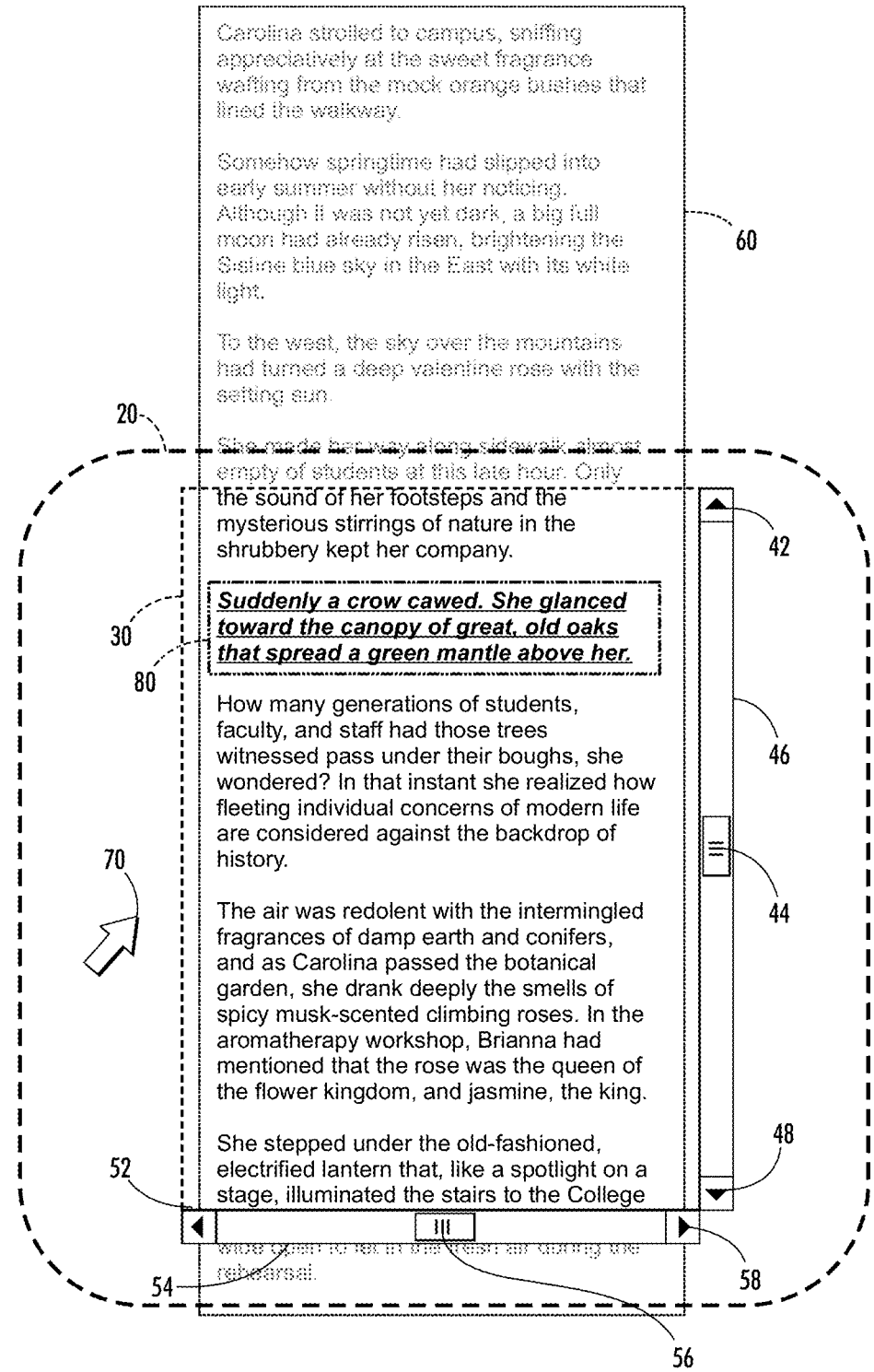

As illustrated in FIGS. 7 and 8, the relative movement of the demarcated content 80 in the display area 20 is upward in accordance with the downward direction of the scrolling operation.

Figure 9:
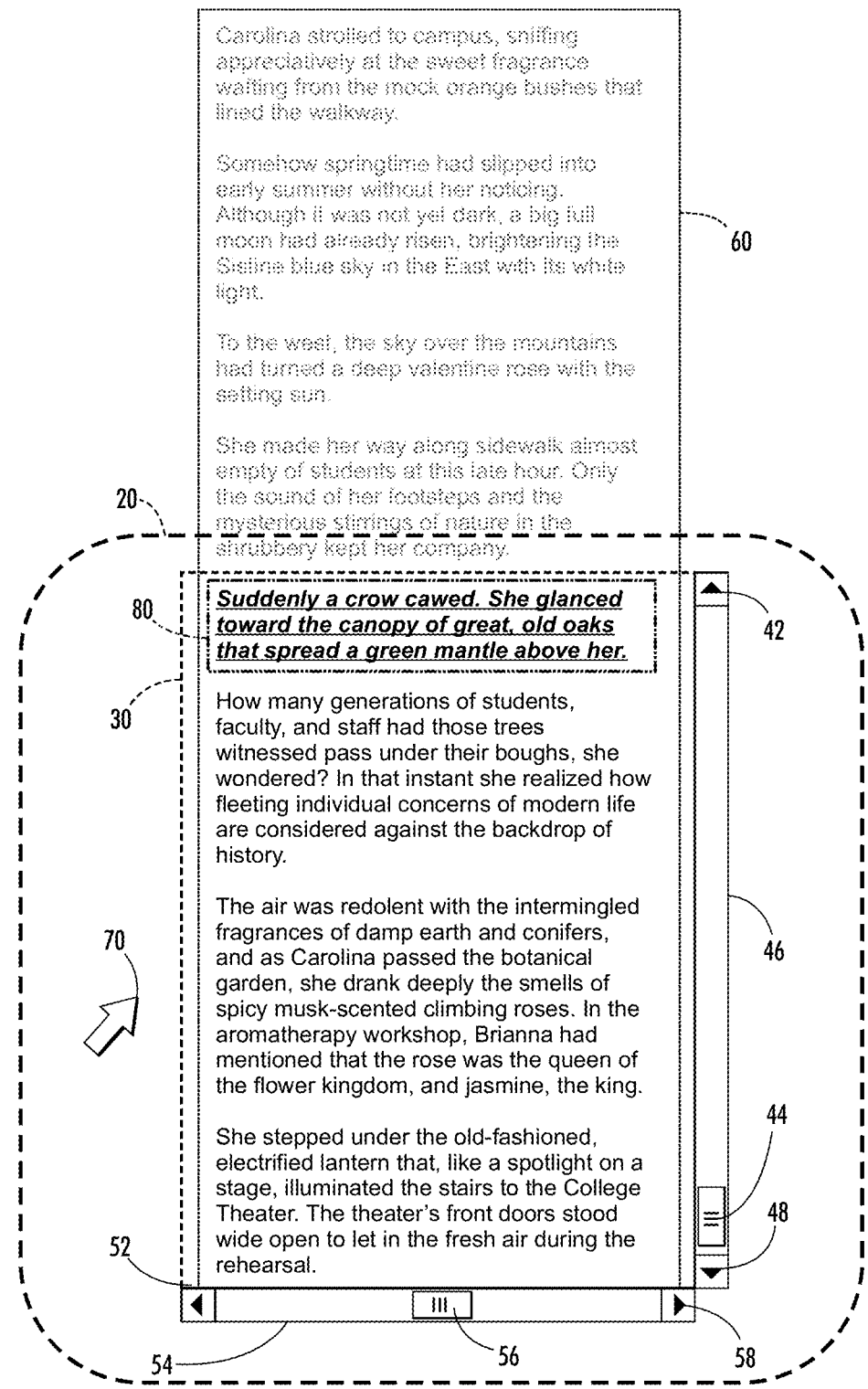

FIG. 9 illustrates the state of the scrolling content moving operation wherein the demarcated content 80 has reach the end of the display area 20. If the user continues to scroll beyond this point, the user may lose the benefit of the visual tool or marker (indicia).

Figure 10:
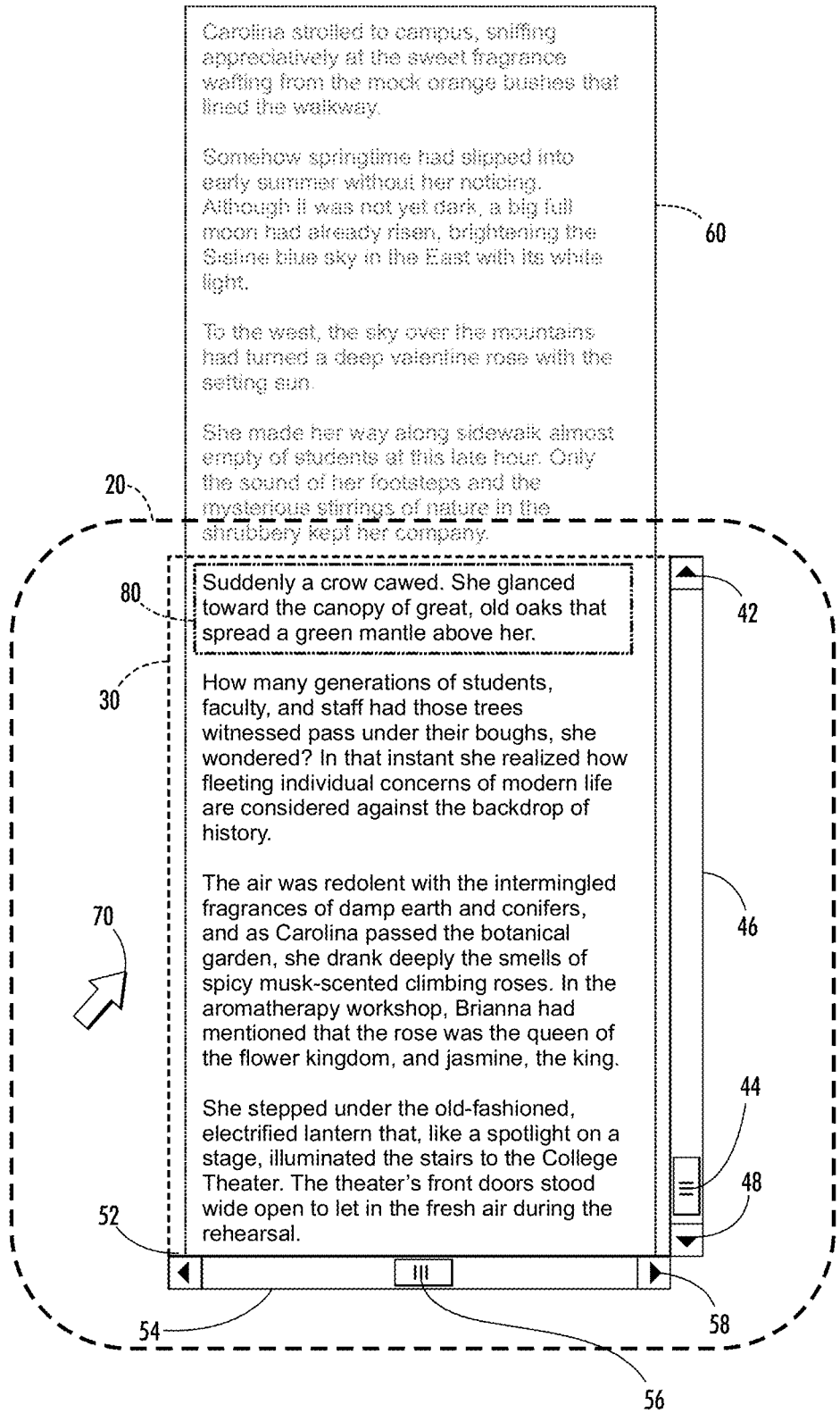

If the user selects to terminate the scrolling content moving operation at the point illustrated in FIG. 9, the previously demarcated content 85, after a predetermined period of time, reverts back to its original format, as illustrated in FIG. 10, thereby eliminating the visual tool or marker (indicia).

As discussed above, the example illustrated in FIGS. 4-10 provide vestigial content from the displayed content to provide a point of reference so that the user can consistently have a relevant point of reference within the displayed content that is associated with the actual scrolling direction selected by the user.

It is noted that the visual tool or marker (indicia) can be visually displayed in a variety of ways including, but not limited to, reverse video, bold/colored text, italicized, and/or graphic elements, such as brackets or a box to enable the user to readily identify the vestigial content.

As disclosed above, at the first instance of scrolling, a point of reference is established in order to demarcate the vestigial portion of the content. After a predetermined period of time after the user stops scrolling, the demarcation fades from view. This visual feedback (the visual tool or marker (indicia)) may enhance the user's ability to maintain focus within the context of the displayed content, while the content is in a state of transition, thereby reducing error, frustration, and eye strain, and enhancing productivity.

It is noted that while vertical scrolling has been disclosed, the visual marking technique is equally applicable for horizontally scrolled content and for two dimensional scrolling.

As noted above, a transient visual tool or marker may be provided for direct visual guidance to the user relative the newly revealed portion of the scrolled content that is continually being exposed to view (becoming viewable) during a touch/flicking content moving operation. An example of a touch/flicking content moving process that provides a transient visual tool or marker is illustrated in FIGS. 16-23.

Figure 16:
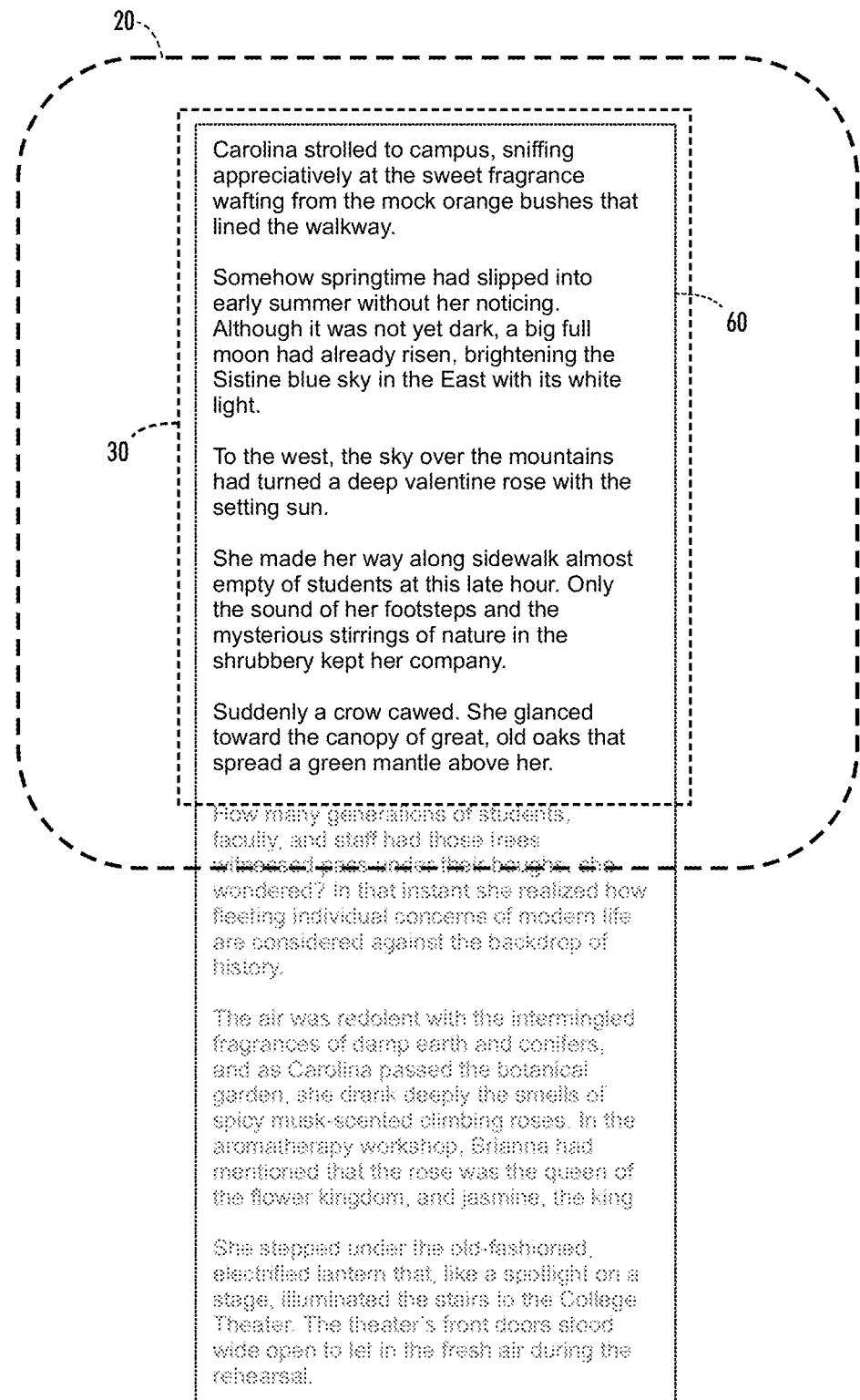

As illustrated in FIG. 16, a display area 20 is provided to display content. The display area 20 may be part of a display device (not shown), wherein the display device is a touchscreen display (the user interfaces directly with the displayed content by touching the display area 20).

The display area 20 may display content 60 in a window 30 created by an application or other software, as illustrated in FIG. 16. The window 30 does not include visible navigational graphical user interfaces or icons to enable a user to navigate the displayed content 60 because the touch/flicking content moving operation relies more on the natural free-flowing interaction between the user and the displayed content.

As illustrated in FIG. 16, the content 60 to be displayed may not always fit within the window 30. As shown in FIG. 16, the content 60 includes a portion (black text) that is viewable within the window 30, and a portion (greyed text) that is not viewable within the window 30.

To view the non-viewable portion, the user would move an object (typically the user's finger) across the window 30 in an upward direction. The direction and/or the inertia and/or speed of the movement of the object would determine the amount and direction of the content movement.

Figure 17:
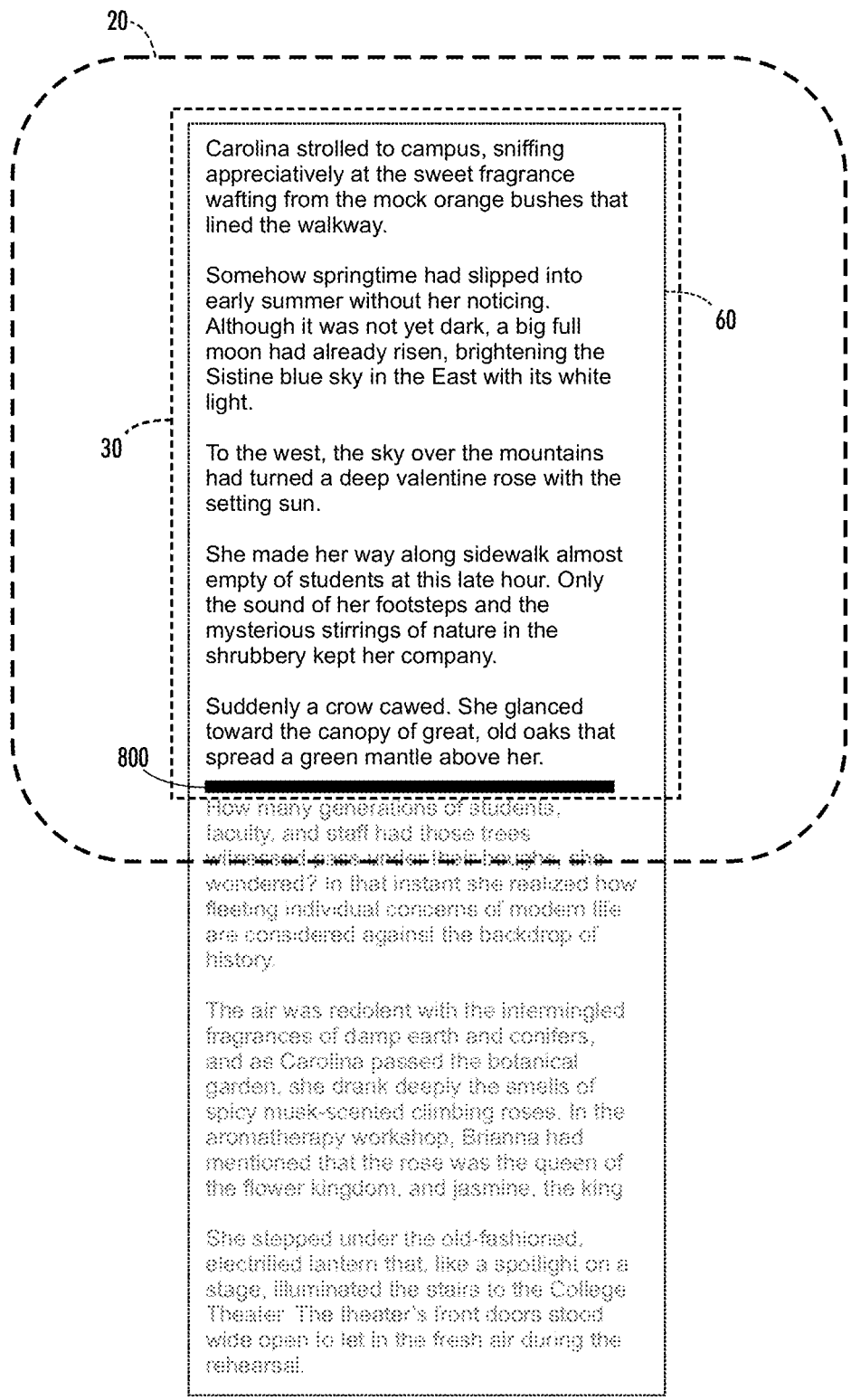

If the touch/flicking direction selected by the user is upward (the viewing window is moved downward relative to the content although the content appears to move upward), the touch/flicking content moving operation would select a location at the bottom of the display area 20, as illustrated in FIG. 17, to be demarcated with the visual tool or marker (indicia).

Figure 18:
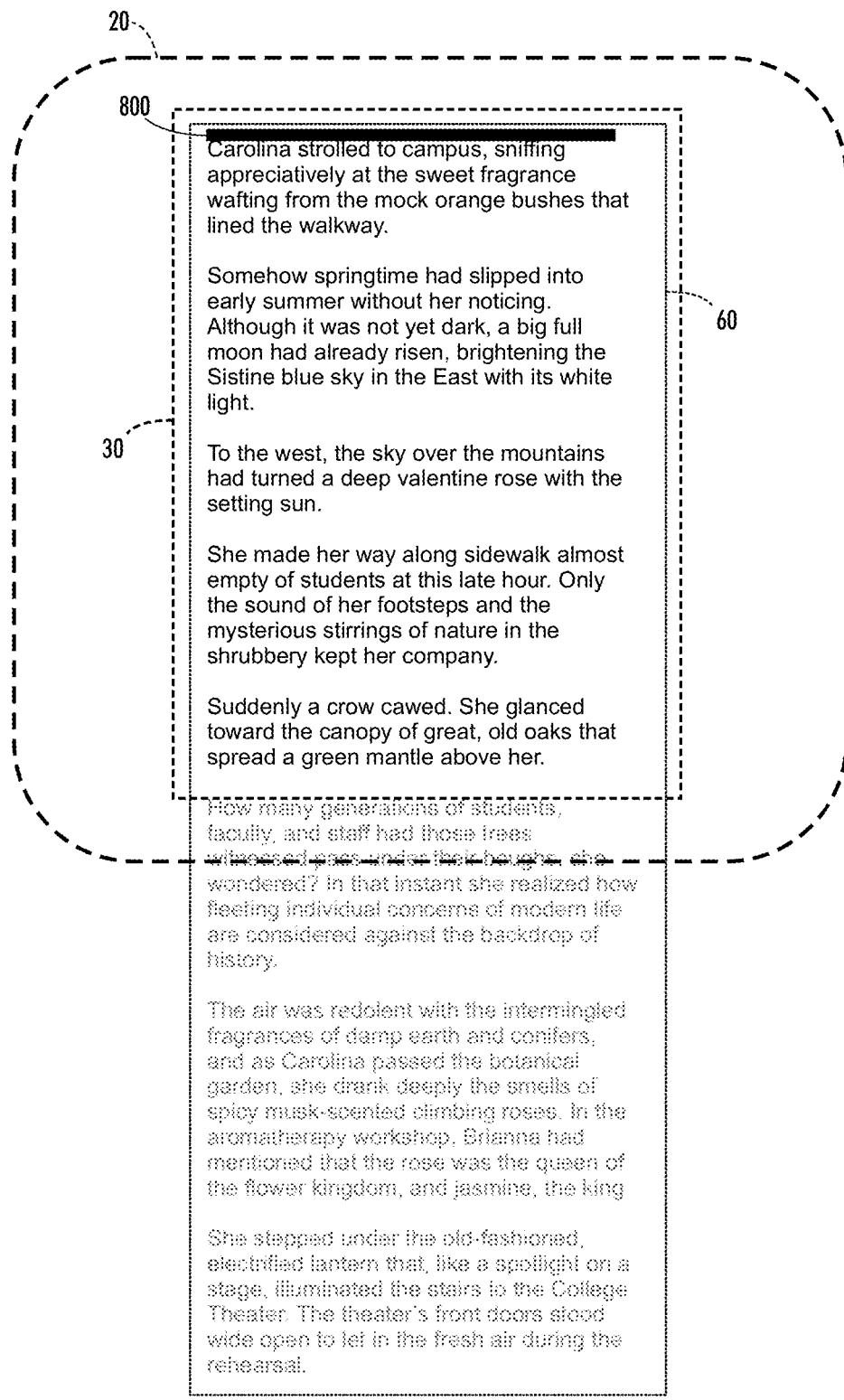

On the other hand, if the touch/flicking direction selected by the user is downward (the viewing window is moved upward relative to the content although the content appears to move downward), the touch/flicking content moving operation would select a location at the top of the display area 20, as illustrated in FIG. 18, to be demarcated with the visual tool or marker (indicia).

In other words, to provide a visual tool or marker (indicia) so that the user can readily identify the end (with respect to the direction of content movement) of the previously displayed content, the display unit demarcates a portion of the displayed content.

Figure 19:
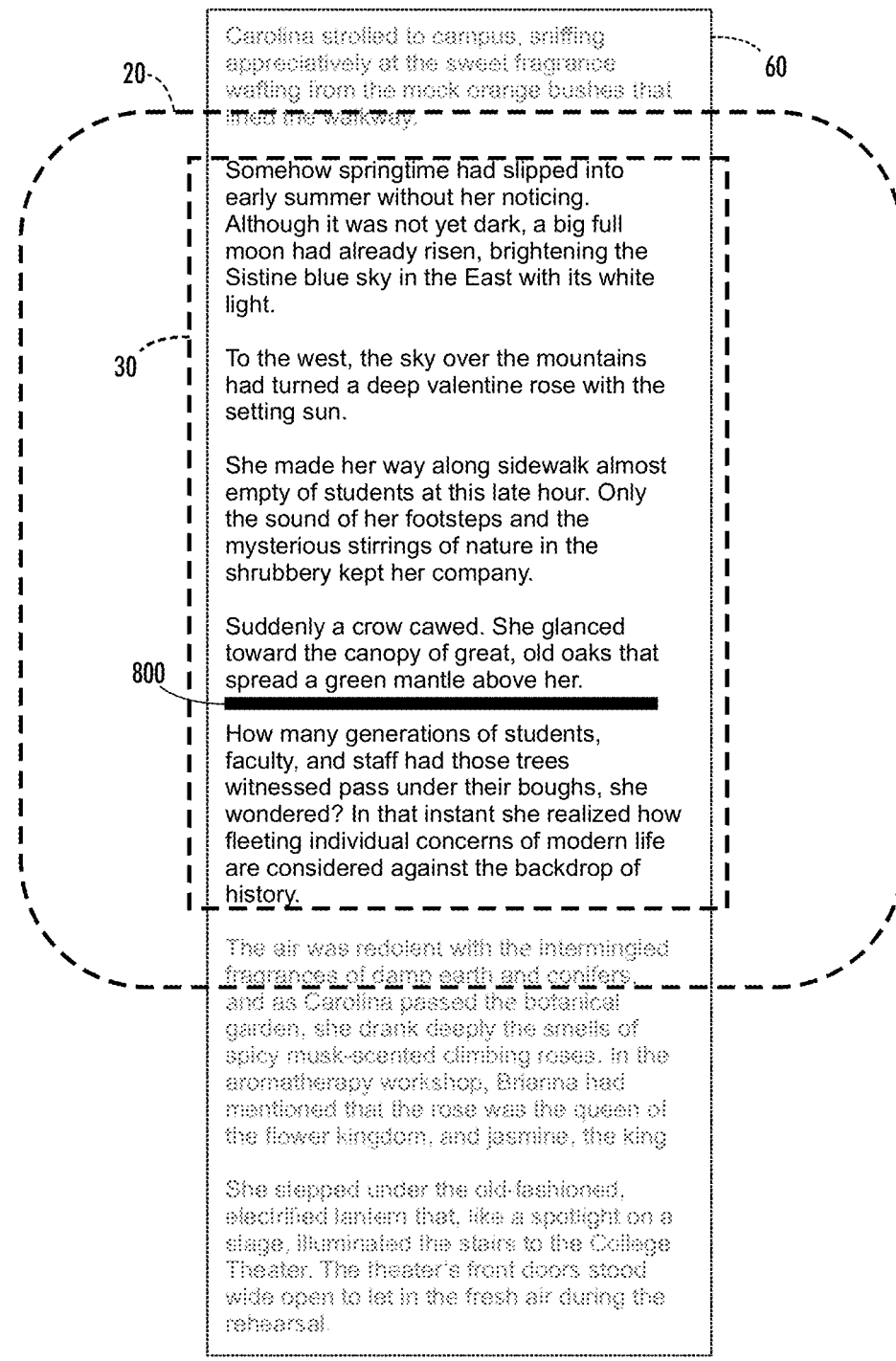

As illustrated in FIG. 19, the upward movement of the object over the display area 30 causes the previously viewable paragraph starting with "Carolina" to move upward in a continuous fashion in accordance with the sensed inertia or speed of the moving object. Eventually, the previously viewable paragraph starting with "Carolina" (grayed text) is not viewable within the window 30, and the previously non-viewable paragraph starting with "How many" (black text) becomes viewable in the window 30.

As illustrated in FIG. 19, the demarcated visual tool 800 is a solid line. It is noted that the demarcated visual tool 800 could also have been highlighted content or content enclosed within a box or other type of marker or visual tool.

The touch/flicking content moving operation determines, based upon the direction of the object moving over the display area 30, the location of the demarcation visual tool or marker (indicia).

The touch/flicking content moving operation may continue to cause the viewing window to move downward (the content appearing to move upward) depending upon sensed inertia and/or speed, the demarcated visual tool 800 remains the same, but its relative location in the display area 20 moves in accordance with the direction of the touch/flicking content moving operation.

Figure 20:
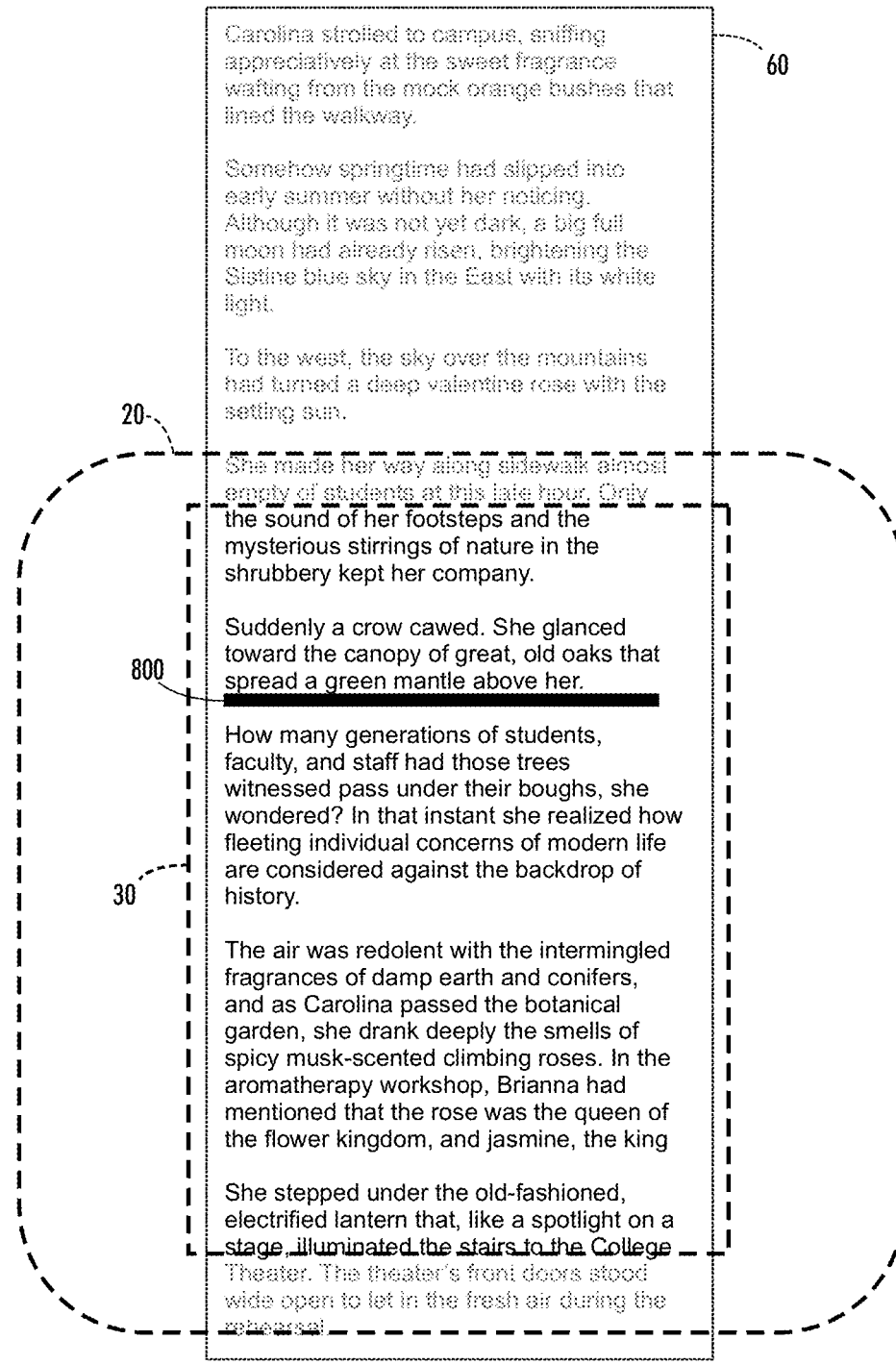

As illustrated in FIGS. 19-21, the relative movement of the demarcated visual tool 800 in the display area 20 is upward in accordance with the direction of the touch/flicking content moving operation.

FIG. 22 illustrates the state of the touch/flicking content moving operation wherein the demarcated visual tool 800 has gone beyond the end of the display area 20. By having the demarcated visual tool 800 go beyond the end of the display area 20, the user may have lost the benefit of the demarcated visual tool 800.

In this situation, the touch/flicking content moving operation may provide a retraction visual marker 900 to inform the user the direction that the object needs to move over the display area 30 to have the demarcated visual tool 800 return to view in the display area 30. It is noted that the retraction visual marker 900 may be orientated differently to inform the user of the location of the non-viewable demarcated visual tool 800, thereby indirectly informing the user of the direction that the object needs to move over the display area 30 to have the demarcated visual tool 800 return to view in the display area 30.

It is noted that retraction visual marker 900 may be an activatable area to enable discrete constrained movement of the content.

If the touch/flicking content moving operation is terminated, the previously demarcated visual tool 850, after a predetermined period of time, reverts back to its original format, as illustrated in FIG. 23, thereby eliminating the visual tool or marker (indicia).

As discussed above, the examples provide vestigial content from the displayed content to provide a point of reference so that the user can consistently have a relevant point of reference within the displayed content that is associated with the actual touch/flicking direction carried out by the user.

It is noted that the visual tool or marker (indicia) can be visually displayed in a variety of ways including, but not limited to, reverse video, bold/colored text, italicized, and/or graphic elements, such as brackets or a box to enable the user to readily identify the vestigial content.

As disclosed above, at the first instance of a touch/flicking operation, a point of reference is established in order to demarcate the vestigial portion of the content. After a predetermined period of time after the user stops the touch/flicking operation, the demarcation fades from view. This visual feedback (the visual tool or marker (indicia)) may enhance the user's ability to maintain focus within the context of the displayed content, while the content is in a state of transition, thereby reducing error, frustration, and eye strain, and enhancing productivity.

It is noted that while vertical scrolling has been disclosed, the visual marking technique is equally applicable for horizontally scrolled content and for two dimensional scrolling.

Figure 11:
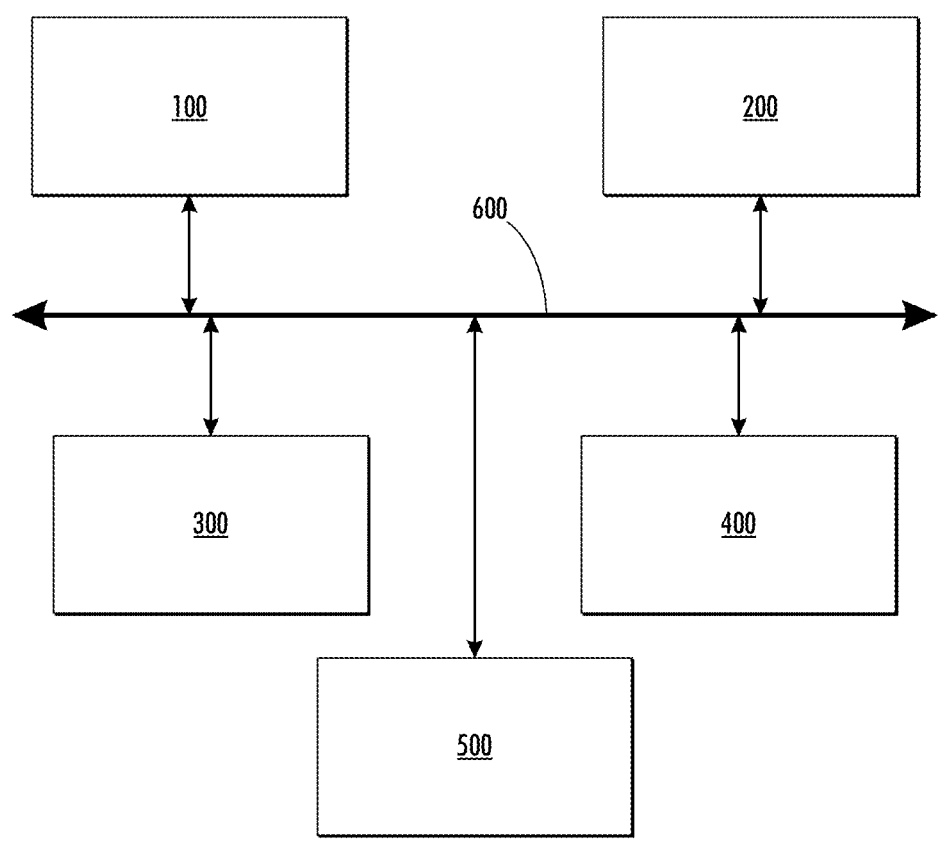
FIG. 11 shows a block diagram of a system to enable a demarcated content moving operation.

FIG. 11 is a block diagram of a display apparatus or system that can execute the above discussed scrolling and/or touch/flicking content moving operation. As illustrated in FIG. 11, the display apparatus or system includes a processor 100 operatively connected to a bus 600. The bus 600 is also operatively connected to a display device 200, a memory 300, a user input/output device 400, and a data input/output device 500.

The processor controls the operations of the display device 200, based upon software stored in memory 300.

The user input/output device 400 may be a keyboard, a mouse, a microphone, or other device capable of interacting with a user to provide a communicative interface between the user and the processor 100.

The data input/output device 500 may be a receiver/transmitter, data ports, or reader/writers for receiving portable storage medium, wherein the data input/output device 500 provides a communicative interface between a source of data or content and the processor 100.

The processor 100 causes the display device 200 to display content to be displayed such that some of the content to be displayed is non-viewable on a display screen of the display device 200. The processor 100 may cause the display device 200, in a scrolling system, to display user-activatable directionally scrolling command areas for enabling a user to directionally scroll the content when some of the content to be displayed is non-viewable on the display screen.

In response to activation of a displayed user-activatable directionally scrolling command area by a user, the processor 100, in a scrolling system, may determine a location within the portion of the content being displayed on the display screen, wherein the determined location corresponds to a directional characteristic of the activated displayed user-activatable directionally scrolling command area.

The processor 100 causes the display device 200 to display a visual indicia at the determined location within the portion of the content being displayed on the display screen, wherein the visual indicia provides a user orientation marker for the portion of the content being displayed on the display screen, and causes the display device 200 to visually move the visual indicia on the display screen in a direction opposite to the directional characteristic of the activated displayed user-activatable directionally scrolling command area or in a direction corresponding to the directional characteristic of the object being moved over the display area.

It is noted that a computer-readable storage medium can provide a display apparatus or system with the appropriate software so that the scrolling and/or touch/flicking content moving operation may provide the visual tool or marker (indicia).

In summary, an apparatus for presenting electronic content in a human readable form includes a display unit for enabling content to be displayed in a human readable form and the display unit including a display screen for displaying the content to be displayed.

The display screen displays a portion of the content to be displayed such that some of the content to be displayed is non-viewable on the display screen and may display user-activatable directionally scrolling command areas for enabling a user to directionally scroll the content when some of the content to be displayed is non-viewable on the display screen.

The display unit, in response to activation of a displayed user-activatable directionally scrolling command area by a user, determines a location within the portion of the content being displayed on the display screen, the determined location corresponding to a directional characteristic of the activated displayed user-activatable directionally scrolling command area.

The display unit causes a visual indicia to be displayed at the determined location within the portion of the content being displayed on the display screen, the visual indicia providing a user orientation marker for the portion of the content being displayed on the display screen and causes the visual indicia to visually move on the display screen in a direction opposite to the directional characteristic of the activated displayed user-activatable directionally scrolling command area.

The visual indicia may be a highlighting of a determined portion of the content being displayed on the display screen corresponding to the determined location, a border around a determined portion of the content being displayed on the display screen corresponding to the determined location, a change in a transparency characteristic of a determined portion of the content being displayed on the display screen corresponding to the determined location, or a graying of a determined portion of the content being displayed on the display screen corresponding to the determined location. The visual indicia may move in an upwardly vertical direction when the directional characteristic of the activated displayed user-activatable directionally scrolling command area is a downwardly vertical direction, or may move in a downwardly vertical direction when the directional characteristic of the activated displayed user-activatable directionally scrolling command area is an upwardly vertical direction.

A method for presenting electronic content in a human readable form on a display device enables content to be displayed in a human readable form; displays, on a display screen, content to be displayed; displays a portion of the content to be displayed such that some of the content to be displayed is non-viewable on the display screen; displays user-activatable directionally scrolling command areas for enabling a user to directionally scroll the content when some of the content to be displayed is non-viewable on the display screen; determines, in response to activation of a displayed user-activatable directionally scrolling command area by a user, a location within the portion of the content being displayed on the display screen, the determined location corresponding to a directional characteristic of the activated displayed user-activatable directionally scrolling command area; causes a visual indicia to be displayed at the determined location within the portion of the content being displayed on the display screen, the visual indicia providing a user orientation marker for the portion of the content being displayed on the display screen; and causes the visual indicia to visually move on the display screen in a direction opposite to the directional characteristic of the activated displayed user-activatable directionally scrolling command area.

The visual indicia may be a highlighting of a determined portion of the content being displayed on the display screen corresponding to the determined location, a border around a determined portion of the content being displayed on the display screen corresponding to the determined location, a change in a transparency characteristic of a determined portion of the content being displayed on the display screen corresponding to the determined location, or a graying of a determined portion of the content being displayed on the display screen corresponding to the determined location. The visual indicia may move in an upwardly vertical direction when the directional characteristic of the activated displayed user-activatable directionally scrolling command area is a downwardly vertical direction, or may move in a downwardly vertical direction when the directional characteristic of the activated displayed user-activatable directionally scrolling command area is an upwardly vertical direction.

A computer-readable storage medium stores a process for causing a display unit to execute the process, wherein the process enables content to be displayed in a human readable form; displays, on a display screen, content to be displayed; displays a portion of the content to be displayed such that some of the content to be displayed is non-viewable on the display screen; displays user-activatable directionally scrolling command areas for enabling a user to directionally scroll the content when some of the content to be displayed is non-viewable on the display screen; determines, in response to activation of a displayed user-activatable directionally scrolling command area by a user, a location within the portion of the content being displayed on the display screen, the determined location corresponding to a directional characteristic of the activated displayed user-activatable directionally scrolling command area; causes a visual indicia to be displayed at the determined location within the portion of the content being displayed on the display screen, the visual indicia providing a user orientation marker for the portion of the content being displayed on the display screen; and causes the visual indicia to visually move on the display screen in a direction opposite to the directional characteristic of the activated displayed user-activatable directionally scrolling command area.

The visual indicia may be a highlighting of a determined portion of the content being displayed on the display screen corresponding to the determined location, a border around a determined portion of the content being displayed on the display screen corresponding to the determined location, a change in a transparency characteristic of a determined portion of the content being displayed on the display screen corresponding to the determined location, or a graying of a determined portion of the content being displayed on the display screen corresponding to the determined location. The visual indicia may move in an upwardly vertical direction when the directional characteristic of the activated displayed user-activatable directionally scrolling command area is a downwardly vertical direction, or may move in a downwardly vertical direction when the directional characteristic of the activated displayed user-activatable directionally scrolling command area is an upwardly vertical direction.

An apparatus for presenting electronic content in a human readable form includes a display unit for enabling content to be displayed in a human readable form. The display unit includes a display screen for displaying the content to be displayed. The display screen displays a portion of the content to be displayed such that some of the content to be displayed is non-viewable on the display screen. The display unit, in response to a user-originating directional content moving action, determines a location within the portion of the content being displayed on the display screen, the determined location corresponding to a directional characteristic of the user-originating directional content moving action. The display unit causes a visual indicia to be displayed at the determined location within the portion of the content being displayed on the display screen, the visual indicia providing a user orientation marker for the portion of the content being displayed on the display screen. The display unit causes the visual indicia to visually move on the display screen in a direction corresponding to the directional movement of the content.

The visual indicia may be a highlighting of a determined portion of the content being displayed on the display screen corresponding to the determined location, a border around a determined portion of the content being displayed on the display screen corresponding to the determined location, a change in a transparency characteristic of a determined portion of the content being displayed on the display screen corresponding to the determined location, or a graying of a determined portion of the content being displayed on the display screen corresponding to the determined location. The visual indicia may move in an upwardly vertical direction when the directional characteristic of the activated displayed user-activatable directionally scrolling command area is a downwardly vertical direction, or may move in a downwardly vertical direction when the directional characteristic of the activated displayed user-activatable directionally scrolling command area is an upwardly vertical direction.

The display screen may display user-activatable directionally scrolling command areas for enabling a user to directionally scroll the content when some of the content to be displayed is non-viewable on the display screen. The display unit, in response to activation of a displayed user-activatable directionally scrolling command area by a user, may determine a location within the portion of the information being displayed on the display screen, the determined location corresponding to a directional characteristic of the activated displayed user-activatable directionally scrolling command area; cause a visual indicia to be displayed at the determined location within the portion of the information being displayed on the display screen, the visual indicia providing a user orientation marker for the portion of the information being displayed on the display screen; and cause the visual indicia to visually move on the display screen in a direction opposite to the directional characteristic of the activated displayed user-activatable directionally scrolling command area.

A method for presenting electronic content in a human readable form on a display device includes enabling content to be displayed in a human readable form; displaying, on a display screen, content to be displayed; displaying a portion of the content to be displayed such that some of the content to be displayed is non-viewable on the display screen; determining, in response to a user-originating directional content moving action, a location within the portion of the content being displayed on the display screen, the determined location corresponding to a directional characteristic of the user-originating directional content moving action; causing a visual indicia to be displayed at the determined location within the portion of the content being displayed on the display screen, the visual indicia providing a user orientation marker for the portion of the content being displayed on the display screen;

and causing the visual indicia to visually move on the display screen in a direction corresponding to the directional movement of the content.

The visual indicia may be a highlighting of a determined portion of the content being displayed on the display screen corresponding to the determined location, a border around a determined portion of the content being displayed on the display screen corresponding to the determined location, a change in a transparency characteristic of a determined portion of the content being displayed on the display screen corresponding to the determined location, or a graying of a determined portion of the content being displayed on the display screen corresponding to the determined location. The visual indicia may move in an upwardly vertical direction when the directional characteristic of the activated displayed user-activatable directionally scrolling command area is a downwardly vertical direction, or may move in a downwardly vertical direction when the directional characteristic of the activated displayed user-activatable directionally scrolling command area is an upwardly vertical direction.

The method may include displaying user-activatable directionally scrolling command areas for enabling a user to directionally scroll the content when some of the content to be displayed is non-viewable on the display screen. The determining of the location is in response to activation of a displayed user-activatable directionally scrolling command area by a user, the determined location corresponding to a directional characteristic of the activated displayed user-activatable directionally scrolling command area, and the causing of the visual indicia to visually move on the display screen in a direction opposite to the directional characteristic of the activated displayed user-activatable directionally scrolling command area.

A computer-readable storage medium for storing a process for causing a display unit to execute the process, the process includes enabling content to be displayed in a human readable form; displaying, on a display screen, content to be displayed; displaying a portion of the content to be displayed such that some of the content to be displayed is non-viewable on the display screen; determining, in response to a user-originating directional content moving action, a location within the portion of the content being displayed on the display screen, the determined location corresponding to a directional characteristic of the user-originating directional content moving action; causing a visual indicia to be displayed at the determined location within the portion of the content being displayed on the display screen, the visual indicia providing a user orientation marker for the portion of the content being displayed on the display screen; and causing the visual indicia to visually move on the display screen in a direction corresponding to the directional movement of the content.

The visual indicia may be a highlighting of a determined portion of the content being displayed on the display screen corresponding to the determined location, a border around a determined portion of the content being displayed on the display screen corresponding to the determined location, a change in a transparency characteristic of a determined portion of the content being displayed on the display screen corresponding to the determined location, or a graying of a determined portion of the content being displayed on the display screen corresponding to the determined location. The visual indicia may move in an upwardly vertical direction when the directional characteristic of the activated displayed user-activatable directionally scrolling command area is a downwardly vertical direction, or may move in a downwardly vertical direction when the directional characteristic of the activated displayed user-activatable directionally scrolling command area is an upwardly vertical direction.

The method may include displaying user-activatable directionally scrolling command areas for enabling a user to directionally scroll the content when some of the content to be displayed is non-viewable on the display screen. The determining of the location is in response to activation of a displayed user-activatable directionally scrolling command area by a user, the determined location corresponding to a directional characteristic of the activated displayed user-activatable directionally scrolling command area, and the causing of the visual indicia to visually move on the display screen in a direction opposite to the directional characteristic of the activated displayed user-activatable directionally scrolling command area.

It will be appreciated that several of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the description above and the following claims.

What is claimed is:

1. An apparatus for presenting electronic content in a human readable form, comprising:
    a display unit for enabling content to be displayed in a human readable form;
    said display unit including a display screen for displaying the content to be displayed;
    said display screen displaying a portion of the content to be displayed such that some of the content to be displayed is non-viewable on said display screen;
    said display unit, in response to a user-originating directional content moving action, determining a location within the portion of the content being displayed on said display screen, the determined location corresponding to a directional characteristic of said user-originating directional content moving action, said user-originating directional content moving action causing the content being displayed on said display screen to move in a directional manner corresponding to a same direction of the directional characteristic of said user-originating directional content moving action;
    said display unit, in response to said user-originating directional content moving action, causing a non-user-activatable visual indicia to be displayed at the determined location within the portion of the content being displayed on said display screen, the non-user-activatable visual indicia providing a user orientation marker for the portion of the content being displayed on said display screen, the user orientation marker enabling identification of an end, with respect to a directional movement of the content being displayed on said display screen, of the content being displayed on said display screen;
    said display unit, in response to said user-originating directional content moving action, causing the non-user-activatable visual indicia to visually move on said display screen in a directional manner corresponding to an opposite direction of the directional movement of the content.

2. The apparatus, as claimed in claim 1, wherein the non-user-activatable visual indicia is a highlighting of a determined portion of the content being displayed on said display screen corresponding to the determined location.

3. The apparatus, as claimed in claim 1, wherein the non-user-activatable visual indicia is a border around a determined portion of the content being displayed on said display screen corresponding to the determined location.

4. The apparatus, as claimed in claim 1, wherein the non-user-activatable visual indicia is a change in a transparency characteristic of a determined portion of the content being displayed on said display screen corresponding to the determined location.

5. The apparatus, as claimed in claim 1, wherein the non-user-activatable visual indicia is a graying of a determined portion of the content being displayed on said display screen corresponding to the determined location.

6. The apparatus, as claimed in claim 1, wherein the non-user-activatable visual indicia is a line at the determined location.

7. The apparatus, as claimed in claim 1, wherein said display screen displays user-activatable directionally scrolling command areas for enabling a user to directionally scroll the content when some of the content to be displayed is non-viewable on said display screen;

said display unit, in response to activation of a displayed user-activatable directionally scrolling command area by a user, determining the location within the portion of the content being displayed on said display screen, the determined location corresponding to a directional characteristic of the activated displayed user-activatable directionally scrolling command area, the activation of said displayed user-activatable directionally scrolling command area causing the content being displayed on said display screen to move in a directional manner corresponding to an opposite direction of the directional characteristic of the activated displayed user-activatable directionally scrolling command area;

said display unit causing a the non-user-activatable visual indicia to be displayed at the determined location within the portion of the content being displayed on said display screen, the non-user-activatable visual indicia providing the user orientation marker for the portion of the content being displayed on said display screen;

said display unit causing the non-user-activatable visual indicia to visually move on said display screen in a direction opposite to the directional characteristic of the activated displayed user-activatable directionally scrolling command area.

8. A method for presenting electronic content in a human readable form on a display device, comprising:

enabling content to be displayed in a human readable form;
displaying, on a display screen, content to be displayed;
displaying a portion of the content to be displayed such that some of the content to be displayed is non-viewable on the display screen;
determining, in response to a user-originating directional content moving action, a location within the portion of the content being displayed on the display screen, the determined location corresponding to a directional characteristic of the user-originating directional content moving action, the user-originating directional content moving action causing the content being displayed on the display screen to move in a directional manner corresponding to a same direction of the directional characteristic of the user-originating directional content moving action;

causing, in response to the user-originating directional content moving action, a non-user-activatable visual indicia to be displayed at the determined location within the portion of the content being displayed on the display screen, the non-user-activatable visual indicia providing a user orientation marker for the portion of the content being displayed on the display screen, the user orientation marker enabling identification of an end, with respect to a directional movement of the content being displayed on said display screen, of the content being displayed on said display screen; and causing, in response to the user-originating directional content moving action, the non-user-activatable visual indicia to visually move on the display screen in a directional manner corresponding to an opposite direction of the directional movement of the content.

9. The method, as claimed in claim 8, wherein the non-user-activatable visual indicia is a highlighting of a determined portion of the content being displayed on the display screen corresponding to the determined location.

10. The method, as claimed in claim 8, wherein the non-user-activatable visual indicia is a border around a determined portion of the content being displayed on the display screen corresponding to the determined location.

11. The method, as claimed in claim 8, wherein the non-user-activatable visual indicia is a change in a transparency characteristic of a determined portion of the content being displayed on the display screen corresponding to the determined location.

12. The method, as claimed in claim 8, wherein the non-user-activatable visual indicia is a graying of a determined portion of the content being displayed on the display screen corresponding to the determined location.

13. The method, as claimed in claim 8, wherein the non-user-activatable visual indicia is a line at the determined location.

14. The method, as claimed in claim 8, further comprising:
displaying user-activatable directionally scrolling command areas for enabling a user to directionally scroll the content when some of the content to be displayed is nonviewable on the display screen;
determining of the location is in response to activation of a displayed user-activatable directionally scrolling command area by a user, the determined location corresponding to a directional characteristic of the activated displayed user-activatable directionally scrolling command area, the activation of the displayed user-activatable directionally scrolling command area causing the content being displayed on the display screen to move in a directional manner corresponding to an opposite direction of the directional characteristic of the activated displayed user-activatable directionally scrolling command area; and
causing of the non-user-activatable visual indicia to visually move on the display screen in a direction opposite to the directional characteristic of the activated displayed user-activatable directionally scrolling command area.

* * * * *